(12) United States Patent
Aio et al.

(10) Patent No.: US 12,732,806 B2
(45) Date of Patent: Sep. 8, 2026

(54) COMMUNICATION APPARATUS AND COMMUNICATION METHOD FOR ENCRYPTION/DECRYPTION PROCESSES BASED ON RELAY DEVICE CAPABILITY

(71) Applicant: Sony Group Corporation, Tokyo (JP)

(72) Inventors: Kosuke Aio, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 413 days.

(21) Appl. No.: 18/554,793

(22) PCT Filed: Feb. 3, 2022

(86) PCT No.: PCT/JP2022/004215
§ 371 (c)(1),
(2) Date: Oct. 11, 2023

(87) PCT Pub. No.: WO2022/244325
PCT Pub. Date: Nov. 24, 2022

(65) Prior Publication Data

US 2024/0121602 A1 Apr. 11, 2024

(30) Foreign Application Priority Data

May 21, 2021 (JP) ................................ 2021-086049

(51) Int. Cl.
*H04W 12/037* (2021.01)
*H04W 12/041* (2021.01)

(52) U.S. Cl.
CPC ....... *H04W 12/041* (2021.01); *H04W 12/037* (2021.01)

(58) Field of Classification Search
CPC .......................... H04W 12/041; H04W 12/037
(Continued)

(56) References Cited

U.S. PATENT DOCUMENTS 11,523,277 B2 * 12/2022 Rajadurai ............. H04W 12/06
2008/0102798 A1 * 5/2008 Fujimoto ................ H04L 63/06 455/411

(Continued)

FOREIGN PATENT DOCUMENTS

JP 2006-050372 A 2/2006
JP 2011-176580 A 9/2011

(Continued)

OTHER PUBLICATIONS

International Search Report and Written Opinion mailed on Apr. 5, 2022, received for PCT Application PCT/JP2022/004215, filed on Feb. 3, 2022, 9 pages including English Translation.

(Continued)

*Primary Examiner* — Thanh T Le
(74) *Attorney, Agent, or Firm* — XSENSUS LLP

(57) ABSTRACT

A communication apparatus that includes a communication unit that communicates with a wireless terminal via a relay device, and that controls execution of an encryption key generation process of generating an encryption key used for communication with the wireless terminal on the basis of at least one of whether or not direct communication with the wireless terminal is possible or an encryption scheme that can be supported by the relay device.

15 Claims, 30 Drawing Sheets

(58) Field of Classification Search
USPC .......................................................... 713/153
See application file for complete search history.

(56) References Cited

U.S. PATENT DOCUMENTS

2008/0219230 A1* 9/2008 Lee .................... H04W 12/041 370/338
2011/0038480 A1* 2/2011 Lin .................. H04W 12/0431 380/278
2011/0305339 A1* 12/2011 Norrman .............. H04W 12/50 380/270
2011/0314522 A1* 12/2011 Palanigounder ....... H04B 7/155 726/4
2012/0008776 A1* 1/2012 Ishida ................ H04W 12/041 380/247
2012/0030466 A1* 2/2012 Yamaguchi ........... H04L 9/3213 713/168
2016/0212682 A1* 7/2016 Chung ................. H04W 76/14
2017/0277496 A1* 9/2017 Mihira ................. G06F 3/1236
2018/0234388 A1* 8/2018 Reddy .................. H04L 63/061
2018/0317089 A1* 11/2018 Levesque ................ H04W 8/30
2019/0327611 A1* 10/2019 Middelesch ........ H04W 12/033
2020/0288535 A1* 9/2020 Sharma ............. H04W 36/0033
2020/0396611 A1* 12/2020 Rajadurai ............. H04W 12/06
2021/0345104 A1* 11/2021 Cheng ............... H04W 12/0433
2021/0345105 A1* 11/2021 Peer ...................... H04W 12/06
2022/0272532 A1* 8/2022 Kim ...................... H04W 60/00
2022/0377551 A1* 11/2022 Sato ......................... G09C 1/00
2022/0386116 A1* 12/2022 Sandell ............... H04L 27/2636
2022/0386397 A1* 12/2022 Prakash ................ H04W 48/16

FOREIGN PATENT DOCUMENTS

JP 2015-091034 A 5/2015
JP 2017-017412 A 1/2017

OTHER PUBLICATIONS

Lee et al., "Virtual BSS For Multi AP Coordination", doc.: IEEE 802.11 19/1019r0, Jul. 2019, pp. 1-12.

* cited by examiner

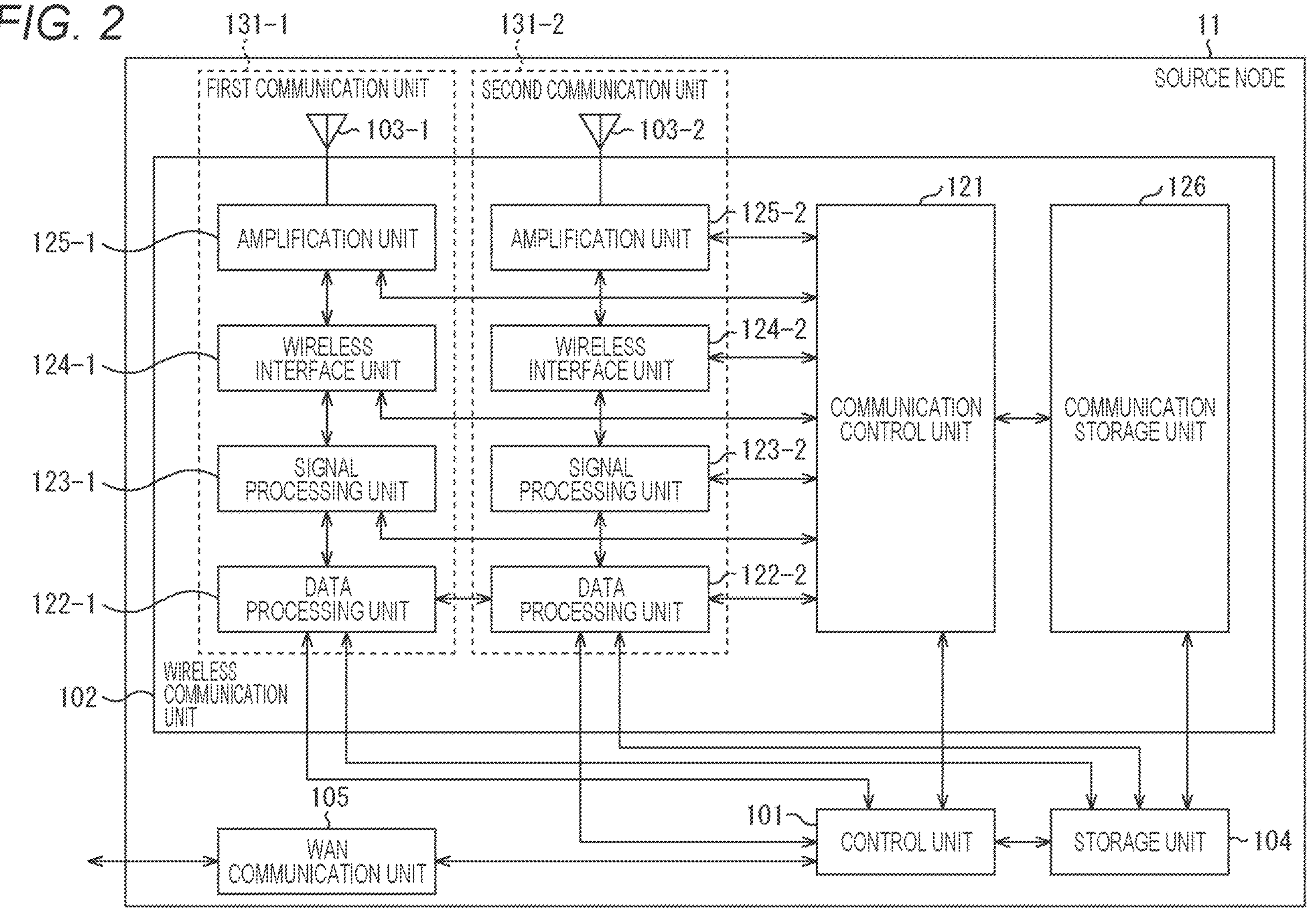
FIG. 2
131-1
131-2
11
SOURCE NODE
FIRST COMMUNICATION UNIT
103-1
SECOND COMMUNICATION UNIT
103-2
121
126
125-1
AMPLIFICATION UNIT
AMPLIFICATION UNIT
125-2
124-1
WIRELESS INTERFACE UNIT
WIRELESS INTERFACE UNIT
124-2
COMMUNICATION CONTROL UNIT
COMMUNICATION STORAGE UNIT
123-1
SIGNAL PROCESSING UNIT
SIGNAL PROCESSING UNIT
123-2
122-1
DATA PROCESSING UNIT
DATA PROCESSING UNIT
122-2
102
WIRELESS COMMUNICATION UNIT
105
101
WAN COMMUNICATION UNIT
CONTROL UNIT
STORAGE UNIT
104

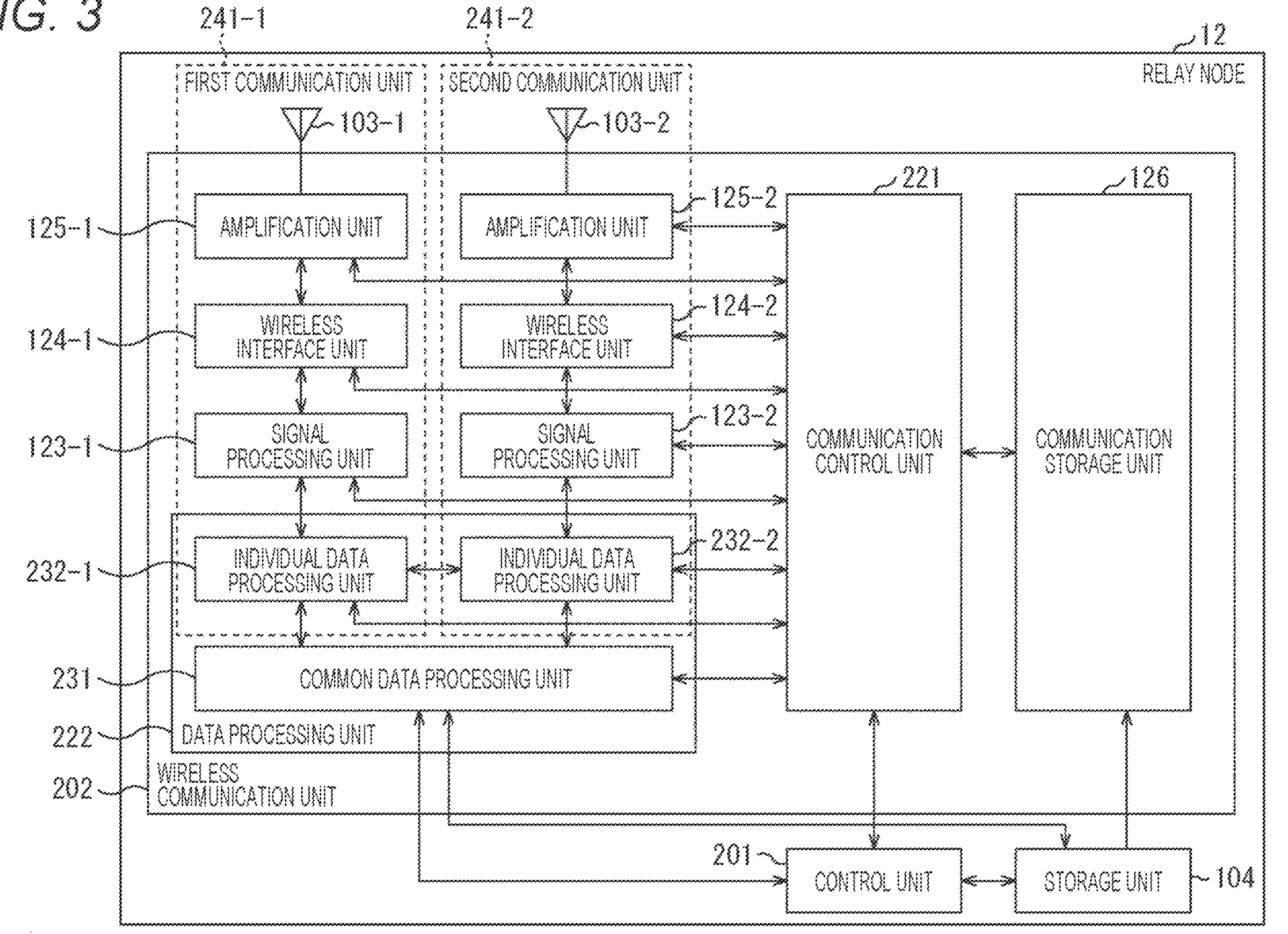
FIG. 3
241-1
241-2
12
RELAY NODE
FIRST COMMUNICATION UNIT
SECOND COMMUNICATION UNIT
103-1
103-2
221
126
125-1
AMPLIFICATION UNIT
AMPLIFICATION UNIT
125-2
124-1
WIRELESS INTERFACE UNIT
WIRELESS INTERFACE UNIT
124-2
123-1
SIGNAL PROCESSING UNIT
SIGNAL PROCESSING UNIT
123-2
COMMUNICATION CONTROL UNIT
COMMUNICATION STORAGE UNIT
232-1
INDIVIDUAL DATA PROCESSING UNIT
INDIVIDUAL DATA PROCESSING UNIT
232-2
231
COMMON DATA PROCESSING UNIT
222
DATA PROCESSING UNIT
202
WIRELESS COMMUNICATION UNIT
201
CONTROL UNIT
STORAGE UNIT
104

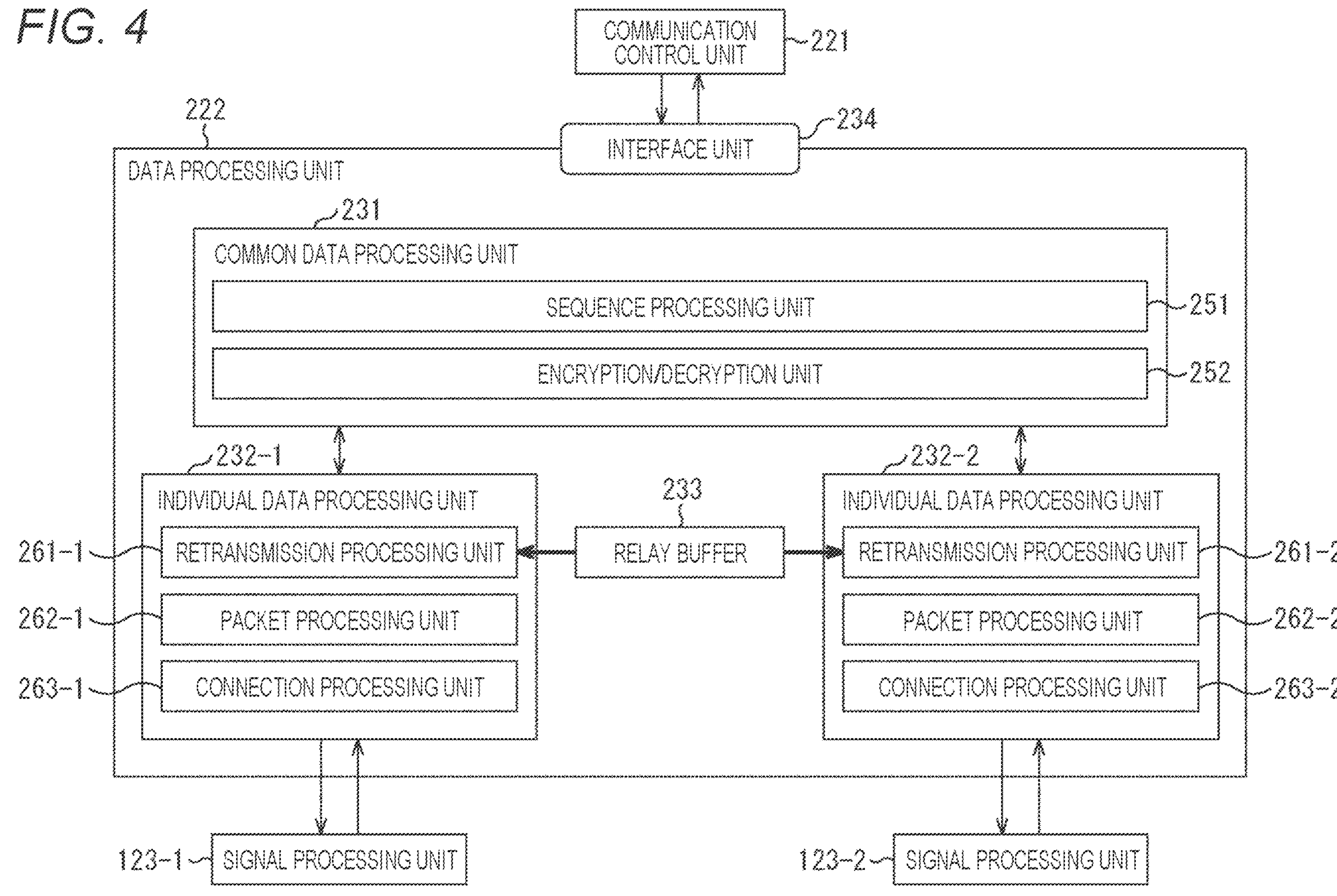
FIG. 4
COMMUNICATION CONTROL UNIT
221
INTERFACE UNIT
234
222
DATA PROCESSING UNIT
231
COMMON DATA PROCESSING UNIT
SEQUENCE PROCESSING UNIT
251
ENCRYPTION/DECRYPTION UNIT
252
232-1
INDIVIDUAL DATA PROCESSING UNIT
233
RELAY BUFFER
232-2
INDIVIDUAL DATA PROCESSING UNIT
261-1
RETRANSMISSION PROCESSING UNIT
RETRANSMISSION PROCESSING UNIT
261-2
262-1
PACKET PROCESSING UNIT
PACKET PROCESSING UNIT
262-2
263-1
CONNECTION PROCESSING UNIT
CONNECTION PROCESSING UNIT
263-2
123-1
SIGNAL PROCESSING UNIT
123-2
SIGNAL PROCESSING UNIT 13
STATION
126
COMMUNICATION STORAGE UNIT
104
STORAGE UNIT
321
COMMUNICATION CONTROL UNIT
CONTROL UNIT
301
COMMUNICATION UNIT
103
AMPLIFICATION UNIT
WIRELESS INTERFACE UNIT
SIGNAL PROCESSING UNIT
DATA PROCESSING UNIT
331
125
124
123
122
WIRELESS COMMUNICATION UNIT
302

FIG. 9

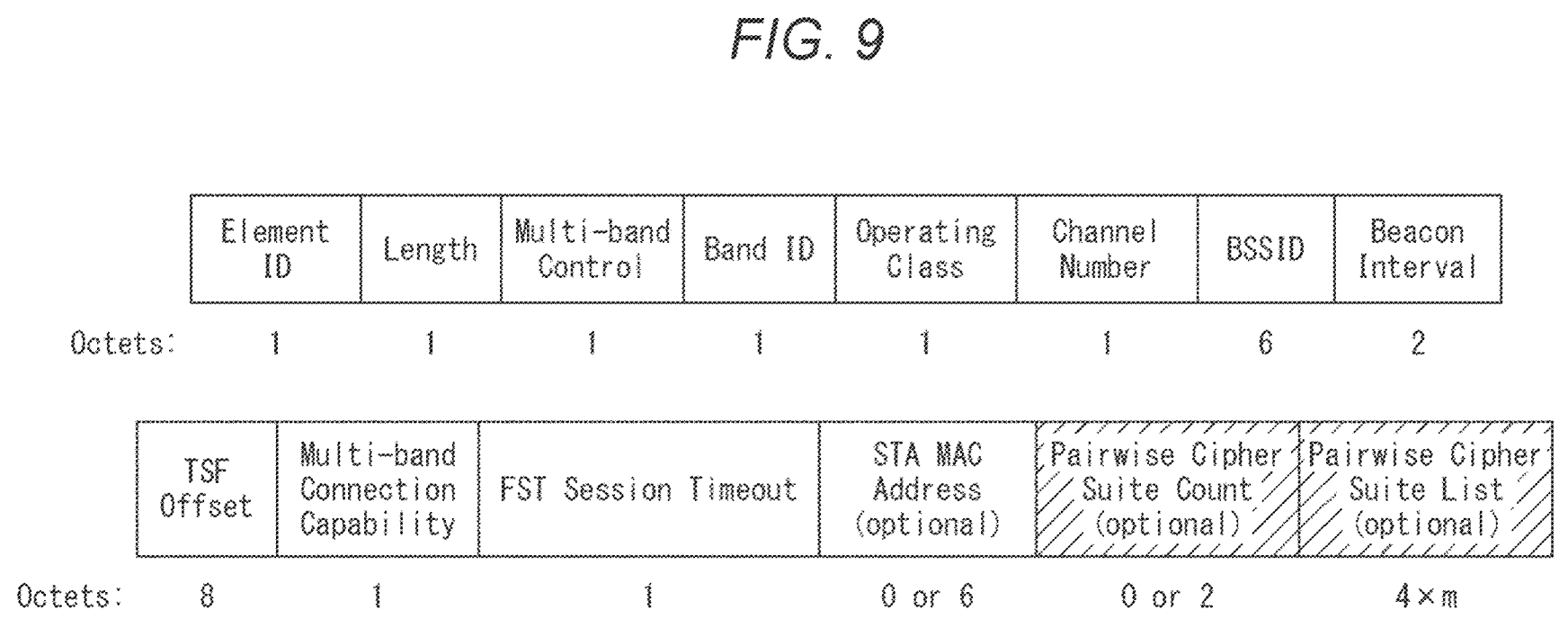

| | Element ID | Length | Multi-band Control | Band ID | Operating Class | Channel Number | BSSID | Beacon Interval |
|---|---|---|---|---|---|---|---|---|
| Octets: | 1 | 1 | 1 | 1 | 1 | 1 | 6 | 2 |

| | TSF Offset | Multi-band Connection Capability | FST Session Timeout | STA MAC Address (optional) | Pairwise Cipher Suite Count (optional) | Pairwise Cipher Suite List (optional) |
|---|---|---|---|---|---|---|
| Octets: | 8 | 1 | 1 | 0 or 6 | 0 or 2 | 4×m |

FIG. 13

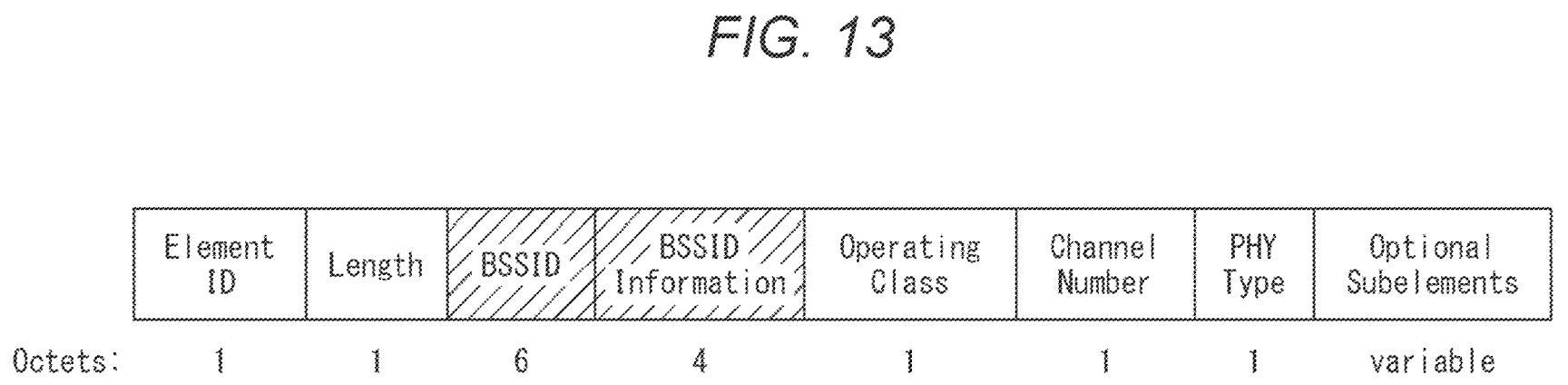

| | Element ID | Length | BSSID | BSSID Information | Operating Class | Channel Number | PHY Type | Optional Subelements |
|---|---|---|---|---|---|---|---|---|
| Octets: | 1 | 1 | 6 | 4 | 1 | 1 | 1 | variable |

FIG. 18

Frame Control
Duration
RA
TA
DA
SA
Frame Body
FCS
RSNE

Frame Control
Duration
RA
TA
Frame Body
FCS
Category
Relay Action
STA Address
RSNE
Proxy Key Generation Element
...
Element ID
Length
Source Node Address
ANonce
MIC Control
MIC
...

FIG. 20

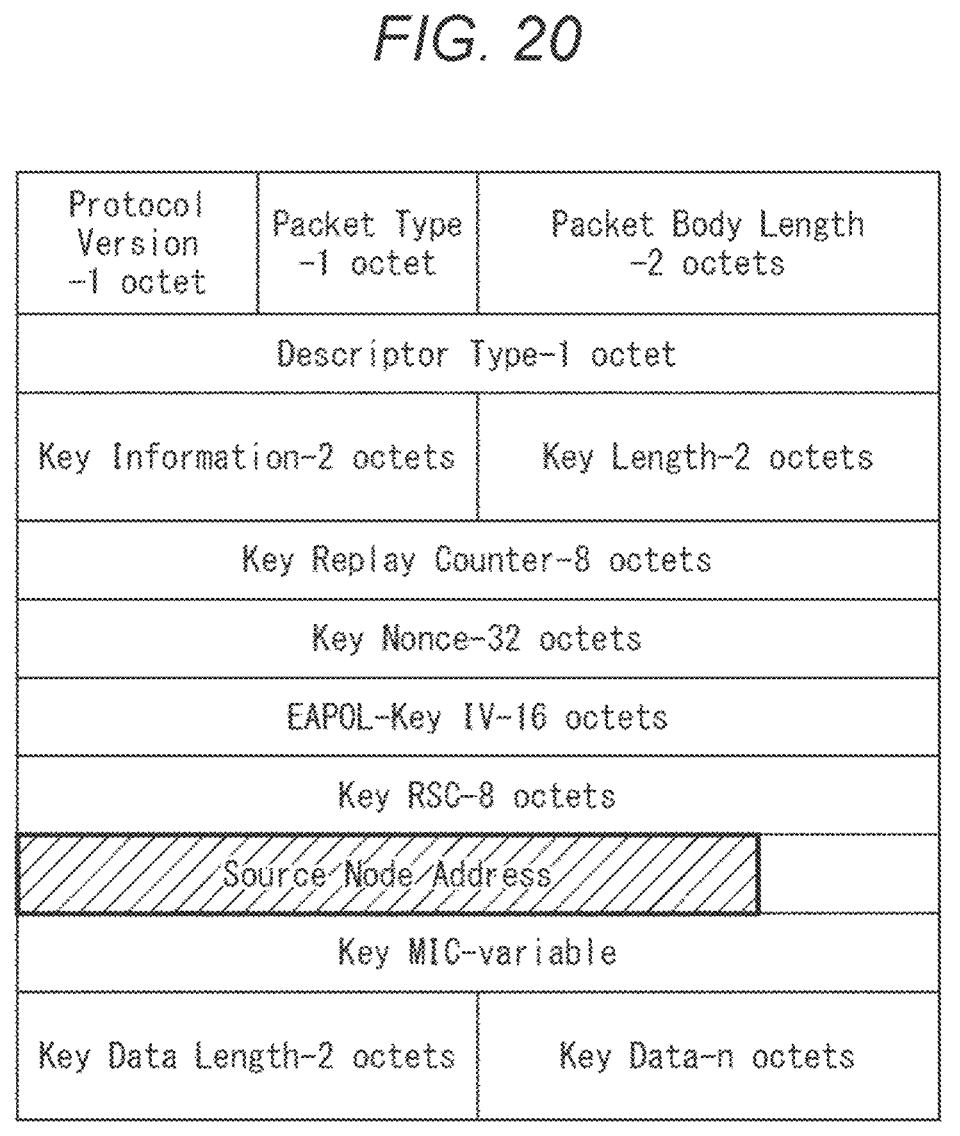

<table>
<tr><td>Protocol Version -1 octet</td><td>Packet Type -1 octet</td><td colspan="2">Packet Body Length -2 octets</td></tr>
<tr><td colspan="4">Descriptor Type-1 octet</td></tr>
<tr><td colspan="2">Key Information-2 octets</td><td colspan="2">Key Length-2 octets</td></tr>
<tr><td colspan="4">Key Replay Counter-8 octets</td></tr>
<tr><td colspan="4">Key Nonce-32 octets</td></tr>
<tr><td colspan="4">EAPOL-Key IV-16 octets</td></tr>
<tr><td colspan="4">Key RSC-8 octets</td></tr>
<tr><td colspan="3">Source Node Address</td><td></td></tr>
<tr><td colspan="4">Key MIC-variable</td></tr>
<tr><td colspan="2">Key Data Length-2 octets</td><td colspan="2">Key Data-n octets</td></tr>
</table>

FIG. 23

| Value | Contents of Data field |
|---|---|
| 0 | Reserved |
| 1 | PMK-R1 key holder identifier (R1KH-ID) |
| 2 | GTK subelement |
| 3 | PMK-R0 key holder identifier (R0KH-ID) |
| 4 | IGTK |
| 5 | Source Node Address |
| 6-225 | Reserved |

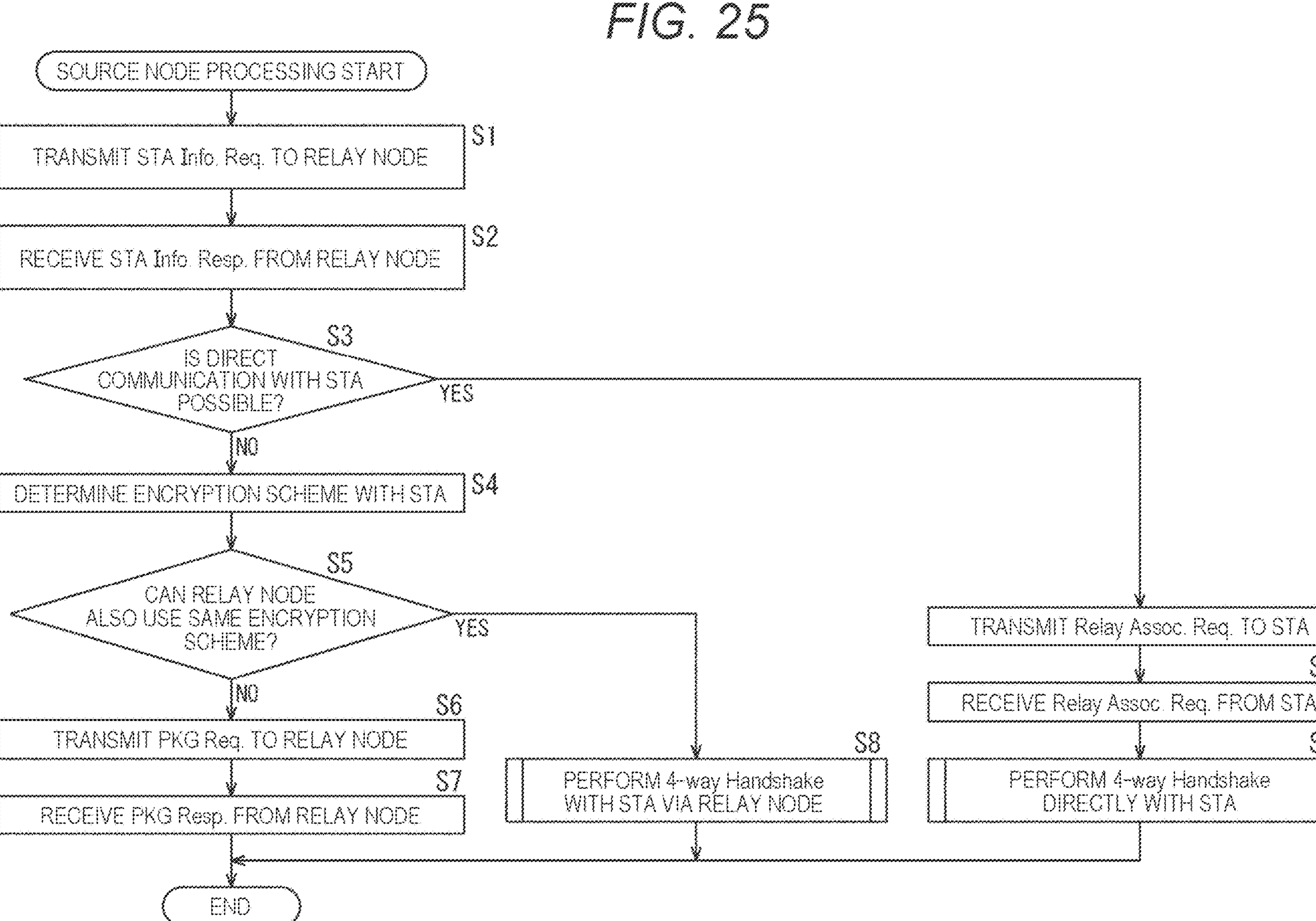
FIG. 25
SOURCE NODE PROCESSING START
S1
TRANSMIT STA Info. Req. TO RELAY NODE
S2
RECEIVE STA Info. Resp. FROM RELAY NODE
S3
IS DIRECT COMMUNICATION WITH STA POSSIBLE?
YES
NO
S4
DETERMINE ENCRYPTION SCHEME WITH STA
S5
CAN RELAY NODE ALSO USE SAME ENCRYPTION SCHEME?
YES
NO
S6
TRANSMIT PKG Req. TO RELAY NODE
S7
RECEIVE PKG Resp. FROM RELAY NODE
END
S8
PERFORM 4-way Handshake WITH STA VIA RELAY NODE
S9
TRANSMIT Relay Assoc. Req. TO STA
S10
RECEIVE Relay Assoc. Req. FROM STA
S11
PERFORM 4-way Handshake DIRECTLY WITH STA

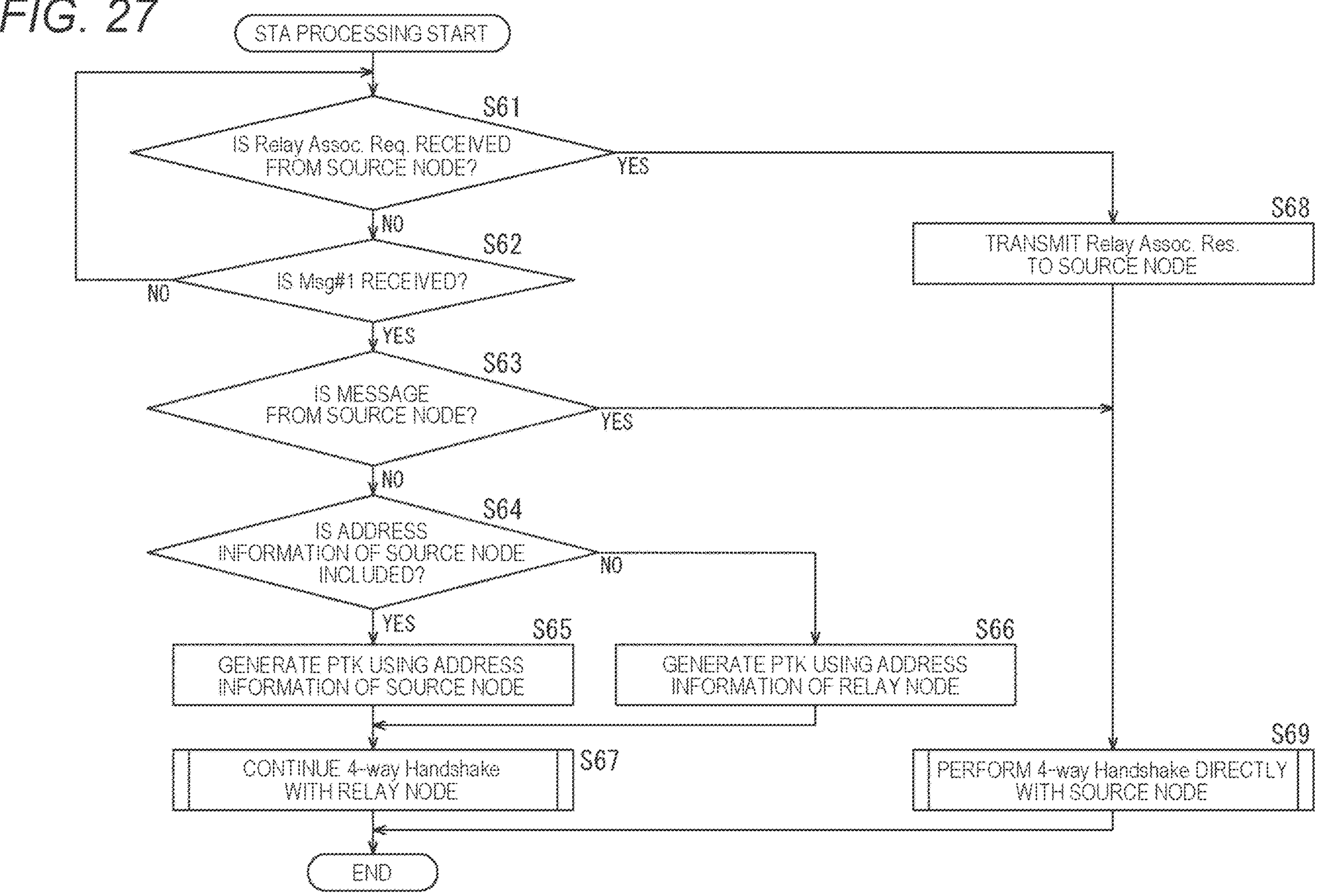
FIG. 27
STA PROCESSING START
S61
IS Relay Assoc. Req. RECEIVED FROM SOURCE NODE?
YES
NO
S62
IS Msg#1 RECEIVED?
NO
YES
S63
IS MESSAGE FROM SOURCE NODE?
YES
NO
S64
IS ADDRESS INFORMATION OF SOURCE NODE INCLUDED?
NO
YES
S65
GENERATE PTK USING ADDRESS INFORMATION OF SOURCE NODE
S66
GENERATE PTK USING ADDRESS INFORMATION OF RELAY NODE
S67
CONTINUE 4-way Handshake WITH RELAY NODE
S68
TRANSMIT Relay Assoc. Res. TO SOURCE NODE
S69
PERFORM 4-way Handshake DIRECTLY WITH SOURCE NODE
END

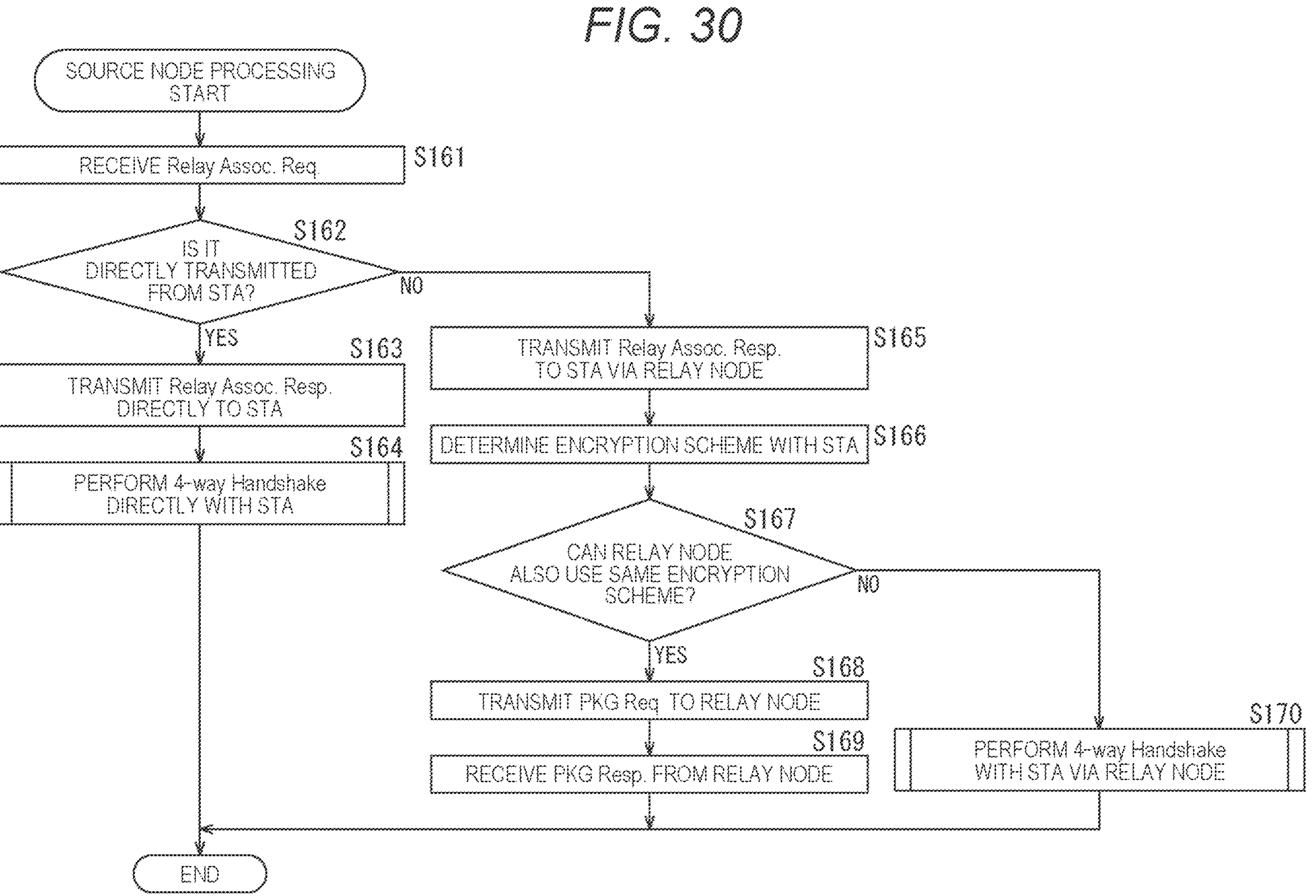
FIG. 30
SOURCE NODE PROCESSING START
RECEIVE Relay Assoc. Req.
S161
IS IT DIRECTLY TRANSMITTED FROM STA?
S162
NO
YES
S163
TRANSMIT Relay Assoc. Resp. DIRECTLY TO STA
S164
PERFORM 4-way Handshake DIRECTLY WITH STA
TRANSMIT Relay Assoc. Resp. TO STA VIA RELAY NODE
S165
DETERMINE ENCRYPTION SCHEME WITH STA
S166
CAN RELAY NODE ALSO USE SAME ENCRYPTION SCHEME?
S167
NO
YES
S168
TRANSMIT PKG Req. TO RELAY NODE
S169
RECEIVE PKG Resp. FROM RELAY NODE
S170
PERFORM 4-way Handshake WITH STA VIA RELAY NODE
END

COMMUNICATION APPARATUS AND COMMUNICATION METHOD FOR ENCRYPTION/DECRYPTION PROCESSES BASED ON RELAY DEVICE CAPABILITY

CROSS-REFERENCE TO RELATED APPLICATIONS

The present application is based on PCT filing PCT/JP2022/004215, filed Feb. 3, 2022, which claims priority from Japanese Patent Application No. 2021-086049, filed May 21, 2021, the entire contents of each are incorporated herein by reference.

TECHNICAL FIELD

The present technology relates to a communication apparatus and a communication method, and more particularly, to a communication apparatus and a communication method capable of simplifying an encryption key generation process in a case of performing relay communication.

BACKGROUND ART

In recent years, products to which Home Mesh AP (Access Point, Radio Base Station) is applied for the purpose of expanding coverage of a wireless Local Area Network (LAN) in a home environment have attracted attention. Although various operation modes can be considered for the Home Mesh AP, in general, one AP is operated as a node (hereinafter, referred to as a source node) connected to the Internet, and the remaining APs are operated as nodes (hereinafter, referred to as relay nodes) that transmit signals to subordinate wireless terminals via wireless or wired communication in many cases. Therefore, a signal is transmitted between the source node and the wireless terminal via the relay nodes. It is assumed that such relay communication by a plurality of APs becomes popular in offices and factories in the future.

Meanwhile, in the future, in order to support a wide range of applications, it is assumed that various wireless characteristics such as low latency and high reliability are required in addition to high throughput for the wireless LAN. However, in the conventional relay communication, retransmission control is not performed between links, or an operation of buffering a packet in a relay node is performed, and thus, low latency and high reliability may be impaired.

In contrast, a Multi-Link Operation (MLO) Relay that relays a packet in the middle of the MAC layer of a relay node has attracted attention. In the MLO Relay, it is expected to perform relay communication with low latency and high reliability by reducing packet buffering in the relay node as much as possible while performing retransmission control in each link.

Furthermore, under the above-described environment, a technology aimed at improving throughput and reliability in cooperation between APs has attracted attention. For example, Joint Transmission (Joint Tx), which is one of cooperative schemes, is a technique of performing cooperative transmission to one wireless terminal (Station, hereinafter referred to as STA) by a plurality of APs while using a Multiple-Input and Multiple-Output (MIMO) technique, and high-dimensional beam formation can be performed without increasing the number of antennas attached to one AP.

In order to implement the Joint Tx, it is necessary for the cooperating APs to share the same packet. Various operation modes have been studied for packet sharing methods, and as one method thereof, as illustrated in Non-Patent Document 1, one AP performs all processes of a Media Access Control (MAC) layer and shares a packet on which MAC processing is completed with another AP that implements Joint Tx. That is, the AP holding the packet for performing the Joint Tx does not perform the MAC processing by itself, and relays the packet to a subordinate terminal while performing the cooperative operation.

CITATION LIST

Non-Patent Document

Non-Patent Document 1: Wook Bong Lee, 3 others, IEEE802.11-19/1019r0 "Virtual BSS For Multi AP Coordination", [online], July 2019

SUMMARY OF THE INVENTION

Problems to be Solved by the Invention

As a common point between the above-described two techniques, a relay node that receives a packet from a source node and relays the packet to a subordinate STA does not perform encryption processing and decryption processing. Therefore, the STA needs to exchange information with the source node and generate an encryption key necessary for encryption and decryption. In IEEE 802.11, it is common to perform an encryption key generation process called 4-way Handshake. However, in a case where 4-way Handshake is performed via a relay node, the number of frame transmissions increases and a processing time increases. In particular, in a case where channel statuses are different between the source node and the relay node and between the relay node and the STA, a transmission waiting time is more likely to occur in each link.

The present technology has been made in view of such a situation, and makes it possible to simplify an encryption key generation process in a case where relay communication is performed.

Solutions to Problems

A communication apparatus according to a first aspect of the present technology includes a communication unit that communicates with a wireless terminal via a relay device, in which the communication unit controls execution of an encryption key generation process of generating an encryption key used for communication with the wireless terminal on the basis of at least one of whether or not direct communication with the wireless terminal is possible or an encryption scheme that can be supported by the relay device.

In a communication method according to a first aspect of the present technology, a communication apparatus that communicates with a wireless terminal via a relay device is configured to control execution of an encryption key generation process of generating an encryption key used for communication with the wireless terminal on the basis of at least one of whether or not direct communication with the wireless terminal is possible or an encryption scheme that can be supported by the relay device.

In the first aspect of the present technology, execution of an encryption key generation process of generating an encryption key used for communication with a wireless terminal is controlled on the basis of at least one of whether or not a communication apparatus that communicates with the wireless terminal via a relay device can directly communicate with the wireless terminal or an encryption scheme that can be supported by the relay device.

A communication apparatus according to a second aspect of the present technology includes a communication unit that relays communication between a radio base station and a wireless terminal, in which in a case of being requested by the radio base station to perform an encryption key generation process of generating an encryption key used by the radio base station for communication with the wireless terminal, the communication unit performs the encryption key generation process with the wireless terminal and transmits the encryption key generated by the encryption key generation process to the radio base station.

In a communication method according to a second aspect of the present technology, a communication apparatus that relays communication between a radio base station and a wireless terminal is configured to, in a case of being requested by the radio base station to perform an encryption key generation process of generating an encryption key used by the radio base station for communication with the wireless terminal, perform the encryption key generation process with the wireless terminal and transmit the encryption key generated by the encryption key generation process to the radio base station.

In the second aspect of the present technology, in a case where execution of an encryption key generation process of generating an encryption key used by the radio base station for communication with the wireless terminal is requested by the radio base station, the encryption key generation process with the wireless terminal is performed, and the encryption key generated by the encryption key generation process is transmitted to the radio base station.

A communication apparatus according to a third aspect of the present technology includes a communication unit that communicates with a radio base station via a relay device, in which the communication unit performs an encryption key generation process of generating an encryption key used for communication with the radio base station directly with the radio base station in a case where direct communication with the radio base station is possible, and performs the encryption key generation process with the relay device in a case where direct communication with the radio base station is not possible.

In a communication method according to a third aspect of the present technology, a communication apparatus that communicates with a radio base station via a relay device is configured to perform an encryption key generation process of generating an encryption key used for communication with the radio base station directly with the radio base station in a case where direct communication with the radio base station is possible, and perform the encryption key generation process with the relay device in a case where direct communication with the radio base station is not possible.

In the third aspect of the present technology, in a case where direct communication with the radio base station is possible, an encryption key generation process of generating an encryption key used for communication with the radio base station is directly performed with the radio base station, and in a case where direct communication with the radio base station is not possible, the encryption key generation process is performed with the relay device.

BRIEF DESCRIPTION OF DRAWINGS

FIG. 2 is a block diagram illustrating a configuration example of a source node.

FIG. 3 is a block diagram illustrating a configuration example of a relay node.

FIG. 4 is a block diagram illustrating a configuration example of a data processing unit of a relay node.

FIG. 9 is a diagram illustrating a configuration example of a Multi-band Element.

FIG. 13 is a diagram illustrating a configuration example of a Neighborhood Element.

FIG. 18 is a diagram illustrating a second configuration example of Relay Association Request/Response.

FIG. 20 is a diagram illustrating a first configuration example of a message #1 of 4-way Handshake.

FIG. 23 is a diagram illustrating a second configuration example of a message #1 of 4-way Handshake.

FIG. 25 is a flowchart for explaining a first example of processing of a source node.

FIG. 27 is a flowchart for explaining a first example of processing of an STA.

FIG. 30 is a flowchart for explaining a second example of source node processing.

MODE FOR CARRYING OUT THE INVENTION

Hereinafter, modes for carrying out the present technology will be described. The description will be given in the following order.

1. Embodiments
2. Modifications
3. Others

1. Embodiments

An embodiment of the present technology will be described with reference to FIGS. 1 to 30.

Configuration Example of Communication System 1

Figure 1:
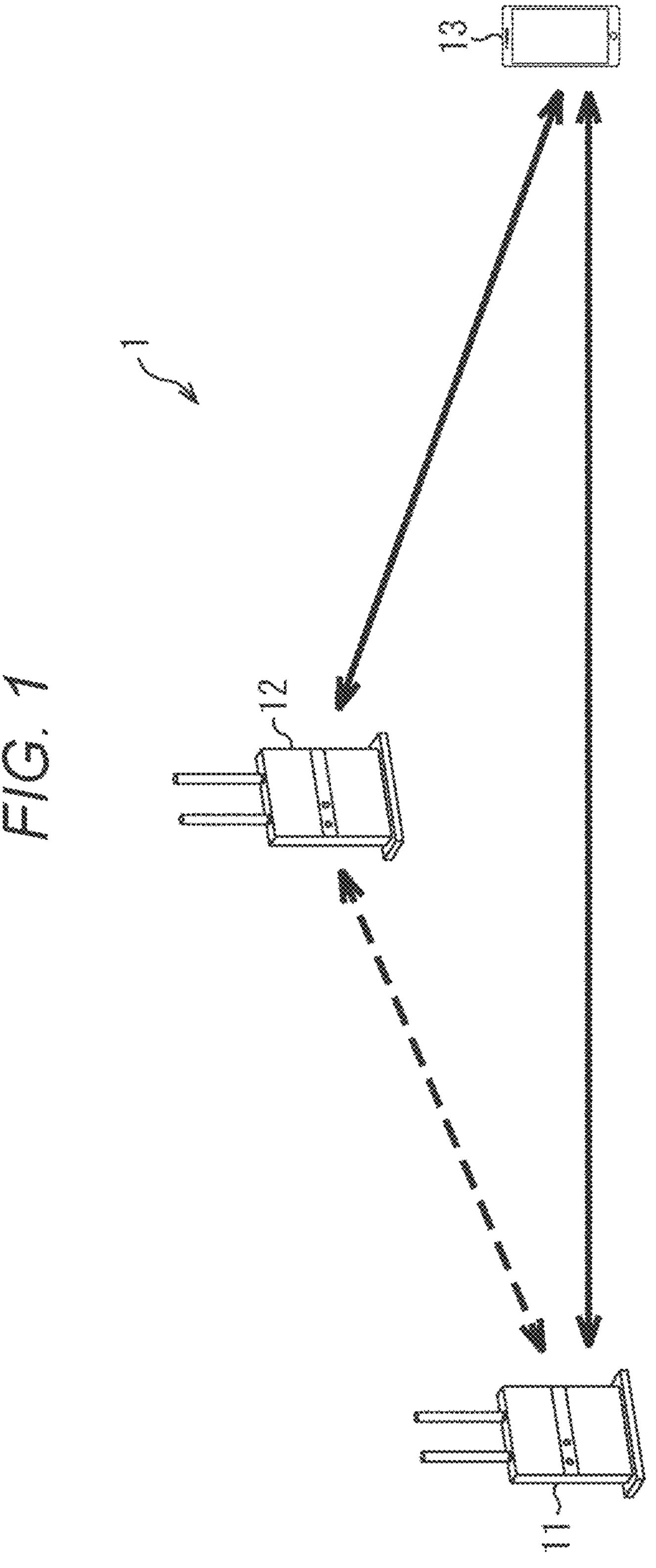
FIG. 1 is a diagram illustrating a configuration example of a communication system to which the present technology is applied.

FIG. 1 illustrates an embodiment of a communication system 1 to which the present technology is applied.

The communication system 1 includes a source node 11, a relay node 12, and a station (STA) 13.

The source node 11 and the relay node 12 are used as APs and perform cell formation. The source node 11 is a node connected to a wide area network (WAN) including, for example, the Internet and the like. The relay node 12 is a node (relay device) that relays communication between the source node 11 and the STA 13.

Hereinafter, the communication link between the source node 11 and the relay node 12 is referred to as a backhaul link. A communication link between the source node 11 and the STA 13 and a communication link between the relay node 12 and the STA 13 are referred to as a fronthaul link. In addition, hereinafter, a state is assumed in which the backhaul link and the fronthaul link operate at different center frequencies and can communicate in parallel.

Configuration Example of Source Node 11

FIG. 2 illustrates a configuration example of a communication apparatus that implements the source node 11 in FIG. 1.

The source node 11 includes a control unit 101, a wireless communication unit 102, an antenna 103-1, an antenna 103-2, a storage unit 104, and a WAN communication unit 105. The wireless communication unit 102 includes a communication control unit 121, a data processing unit 122-1, a data processing unit 122-2, a signal processing unit 123-1, a signal processing unit 123-2, a wireless interface unit 124-1, a wireless interface unit 124-2, an amplification unit 125-1, an amplification unit 125-2, and a communication storage unit 126.

The antenna 103-1, the data processing unit 122-1, the signal processing unit 123-1, the wireless interface unit 124-1, and the amplification unit 125-1 constitute a first communication unit 131-1. The antenna 103-2, the data processing unit 122-2, the signal processing unit 123-2, the wireless interface unit 124-2, and the amplification unit 125-2 constitute a second communication unit 131-2. For example, the first communication unit 131-1 performs a process of wireless communication via the backhaul link. For example, the second communication unit 131-2 performs a process of wireless communication via the fronthaul link. Therefore, the source node 11 can perform parallel processing of a process of wireless communication via the backhaul link and a process of wireless communication via the fronthaul link.

Hereinafter, in a case where it is not necessary to distinguish the antenna 103-1 and the antenna 103-2 individually, they are simply referred to as an antenna 103. Hereinafter, in a case where it is not necessary to distinguish the data processing unit 122-1 and the data processing unit 122-2 individually, they are simply referred to as a data processing unit 122. Hereinafter, in a case where it is not necessary to distinguish the signal processing unit 123-1 and the signal processing unit 123-2 individually, they are simply referred to as a signal processing unit 123. Hereinafter, in a case where it is not necessary to distinguish the wireless interface unit 124-1 and the wireless interface unit 124-2 individually, they are simply referred to as a wireless interface unit 124. In a case where it is not necessary to distinguish the amplification unit 125-1 and the amplification unit 125-2 individually, they are simply referred to as an amplification unit 125.

The control unit 101 controls the communication control unit 121 and the data processing unit 122.

The communication control unit 121 controls operation of each unit of the wireless communication unit 102 and information transmission between the units. Furthermore, the communication control unit 121 performs control to transfer control information and management information to be notified to other communication apparatuses to each data processing unit 122.

Note that, for example, the control unit 101 may perform a part of the processing of the communication control unit 121 instead. Furthermore, for example, the control unit 101 and the communication control unit 121 may be integrated into one.

At the time of transmission, the data processing unit 122 performs sequence management of data held in the communication storage unit 126 and control information and management information acquired from the communication control unit 121. The data processing unit 122 performs encryption processing and the like on the data, the control information, and the management information to generate a data unit. Data processing unit 122 adds the MAC header and the error detection code to the data unit to generate the packet. The data processing unit 122 performs connection processing of a plurality of packets. The data processing unit 122 supplies the packet subjected to the connection processing to the signal processing unit 123.

At the time of reception, the data processing unit 122 performs disconnection processing, MAC header analysis and error detection, decryption processing, retransmission request operation, and reorder processing on the received packet, and extracts data, control information, and management information included in the packet.

At the time of transmission, the signal processing unit 123 performs encoding, interleaving, modulation, and the like on a packet to be transmitted, adds a physical header, and generates a symbol stream. The signal processing unit 123 supplies the generated symbol stream to the wireless interface unit 124.

At the time of reception, the signal processing unit 123 analyzes the physical header of the symbol stream, demodulates the symbol stream, performs deinterleaving, and generates a packet. Furthermore, the signal processing unit 123 performs complex channel characteristic estimation and spatial separation processing as necessary. The signal processing unit 123 supplies the generated packet to the data processing unit 122.

At the time of transmission, the wireless interface unit 124 performs digital-analog signal conversion, filtering, up-conversion, and phase control on the symbol stream to generate a transmission signal. The wireless interface unit 124 supplies the generated transmission signal to the amplification unit 125.

At the time of reception, the wireless interface unit 124 performs down-conversion, filtering, and analog-digital signal conversion on the reception signal to generate a symbol stream. The wireless interface unit 124 supplies the generated symbol stream to the signal processing unit 123.

At the time of transmission, the amplification unit 125 amplifies the transmission signal and transmits the amplified transmission signal to the outside via the antenna 103.

At the time of reception, the amplification unit 125 amplifies the reception signal received via the antenna 103 and supplies the same to the wireless interface unit 124.

Note that some of the functions of the amplification unit 125 may be provided outside the wireless communication unit 102. In addition, some of the functions of the amplification unit 125 may be included in the wireless interface unit 124.

The communication storage unit 126 holds information used by the communication control unit 121. Furthermore, the communication storage unit 126 holds a packet to be transmitted and a packet to be received.

The storage unit 104 holds information used by the control unit 101 and the wireless communication unit 102.

Note that the storage unit 104 may have some of the functions of the communication storage unit 126. Furthermore, the storage unit 104 and the communication storage unit 126 may be integrated into one.

The WAN communication unit 105 analyzes a packet received via the WAN and supplies the packet to the wireless communication unit 102 via the control unit 101.

Here, the format of the packet supplied from the WAN communication unit 105 to the wireless communication unit 102 may be a format in which the IP Header is left as it is (access point mode) or a format in which the IP Header is removed (router mode).

Note that the wireless communication unit 102 may include one IC or a plurality of ICs. For example, a portion of the wireless communication unit 102 excluding the wireless interface unit 124 may constitute one IC, and the wireless interface unit 124 may constitute another IC.

Configuration Example of Relay Node 12

FIG. 3 illustrates a configuration example of a communication apparatus that implements the relay node 12 of FIG. 1. Note that, in the drawing, portions corresponding to those of the source node 11 in FIG. 2 are denoted by the same reference signs, and the description thereof will be omitted as appropriate.

The relay node 12 is identical to the source node 11 in that it includes an antenna 103-1, an antenna 103-2, and a storage unit 104. The relay node 12 is different from the source node 11 in that it includes a control unit 201 and a wireless communication unit 202 instead of the control unit 101 and the wireless communication unit 102, and does not include the WAN communication unit 105.

The wireless communication unit 202 is identical to the wireless communication unit 102 in that it includes a signal processing unit 123-1, a signal processing unit 123-2, a wireless interface unit 124-1, a wireless interface unit 124-2, an amplification unit 125-1, an amplification unit 125-2, and a communication storage unit 126. The wireless communication unit 202 is different from the wireless communication unit 102 in that it includes a communication control unit 221 and a data processing unit 222 instead of the communication control unit 121, the data processing unit 122-1, and the data processing unit 122-2. The data processing unit 222 includes a common data processing unit 231, an individual data processing unit 232-1, and an individual data processing unit 232-2.

The antenna 103-1, the signal processing unit 123-1, the wireless interface unit 124-1, the amplification unit 125-1, and the individual data processing unit 232-1 constitute a first communication unit 241-1. The antenna 103-2, the signal processing unit 123-2, the wireless interface unit 124-2, the amplification unit 125-2, and the individual data processing unit 232-2 constitute a first communication unit 241-1. For example, the first communication unit 241-1 performs a process of wireless communication via the backhaul link. For example, the second communication unit 241-2 performs a process of wireless communication via the fronthaul link. Therefore, the relay node 12 can perform parallel processing of a process of wireless communication via the backhaul link and a process of wireless communication via the fronthaul link.

The control unit 201 controls the communication control unit 221 and the common data processing unit 231.

The communication control unit 221 controls operation of each unit of the wireless communication unit 202 and information transmission between the units. Furthermore, the communication control unit 221 performs control to transfer control information and management information to be notified to another communication apparatus to the data processing unit 222.

Note that, for example, the control unit 201 may perform a part of the processing of the communication control unit 221 instead. Furthermore, for example, the control unit 201 and the communication control unit 221 may be integrated into one.

The common data processing unit 231 performs data processing common to the processing of wireless communication via the fronthaul link and the processing of wireless communication via the backhaul link.

The individual data processing unit 232-1 performs data processing other than the data processing performed by the common data processing unit 231 in the data processing of the wireless communication via the backhaul link.

The individual data processing unit 232-2 performs data processing other than the data processing performed by the common data processing unit 231 in the data processing of the wireless communication via the fronthaul link.

Note that, hereinafter, in a case where it is not necessary to distinguish the individual data processing unit 232-1 and the individual data processing unit 232-2, they are simply referred to as an individual data processing unit 232.

Configuration Example of Data Processing Unit 222

FIG. 4 illustrates a detailed configuration example of the data processing unit 222 in FIG. 3.

The data processing unit 222 includes a relay buffer 233 and an interface unit 234 in addition to the common data processing unit 231, the individual data processing unit 232-1, and the individual data processing unit 232-2 described above.

The common data processing unit 231 includes a sequence processing unit 251 and an encryption/decryption unit 252. The individual data processing unit 232-1 includes a retransmission processing unit 261-1, a packet processing unit 262-1, and a connection processing unit 263-1. The individual data processing unit 232-2 includes a retransmission processing unit 261-2, a packet processing unit 262-2, and a connection processing unit 263-2.

Note that, hereinafter, in a case where it is not necessary to distinguish between the retransmission processing unit 261-1 and the retransmission processing unit 261-2, they are simply referred to as a retransmission processing unit 261. Hereinafter, in a case where it is not necessary to distinguish the packet processing unit 262-1 and the packet processing unit 262-2, they are simply referred to as a packet processing unit 262. Hereinafter, in a case where it is not necessary to distinguish the connection processing unit 263-1 and the connection processing unit 263-2, they are simply referred to as a connection processing unit 263.

At the time of transmission, the sequence processing unit 251 performs sequence management of data held in the communication storage unit 126 and control information and management information acquired from the communication control unit 121 via the interface unit 234.

At the time of reception, the sequence processing unit 251 performs reorder processing of the received data, control information, and management information.

At the time of transmission, the encryption/decryption unit 252 performs encryption processing or the like on the data, the control information, and the management information to generate a data unit, and supplies the data unit to the individual data processing unit 232.

At the time of reception, the encryption/decryption unit 252 performs decryption processing on the data unit and extracts data, control information, and management information.

The retransmission processing unit 261-1 performs retransmission determination processing for the signal received from the backhaul link. Note that the retransmission processing unit 261-1 performs retransmission determination processing for the signal received on the backhaul link, and then transfers the signal to the individual data processing unit 232-2 on the fronthaul link side via the relay buffer 233. This makes it possible to avoid buffering before transfer while maintaining retransmission processing in each link.

At the time of transmission, the packet processing unit 262 adds a MAC header and an error detection code to the data unit to generate a packet.

At the time of reception, the packet processing unit 262 analyzes the MAC header of the received packet and detects an error, acquires a data unit, and supplies the data unit to the common data processing unit 231.

The connection processing unit 263 performs connection processing of a plurality of packets at the time of transmission. The connection processing unit 263 supplies the packet subjected to the connection processing to the signal processing unit 123.

At the time of reception, the connection processing unit 263 performs disconnection processing of the packet supplied from the signal processing unit 123.

Note that, in FIGS. 2 and 3, the source node 11 and the relay node 12 each have a minimum configuration, and each may have another function. For example, the relay node 12 may include a WAN communication unit. For example, the data processing unit 122 of the source node 11 may be divided into two similarly to the relay node 12.

Configuration Example of STA 13

Figure 5:
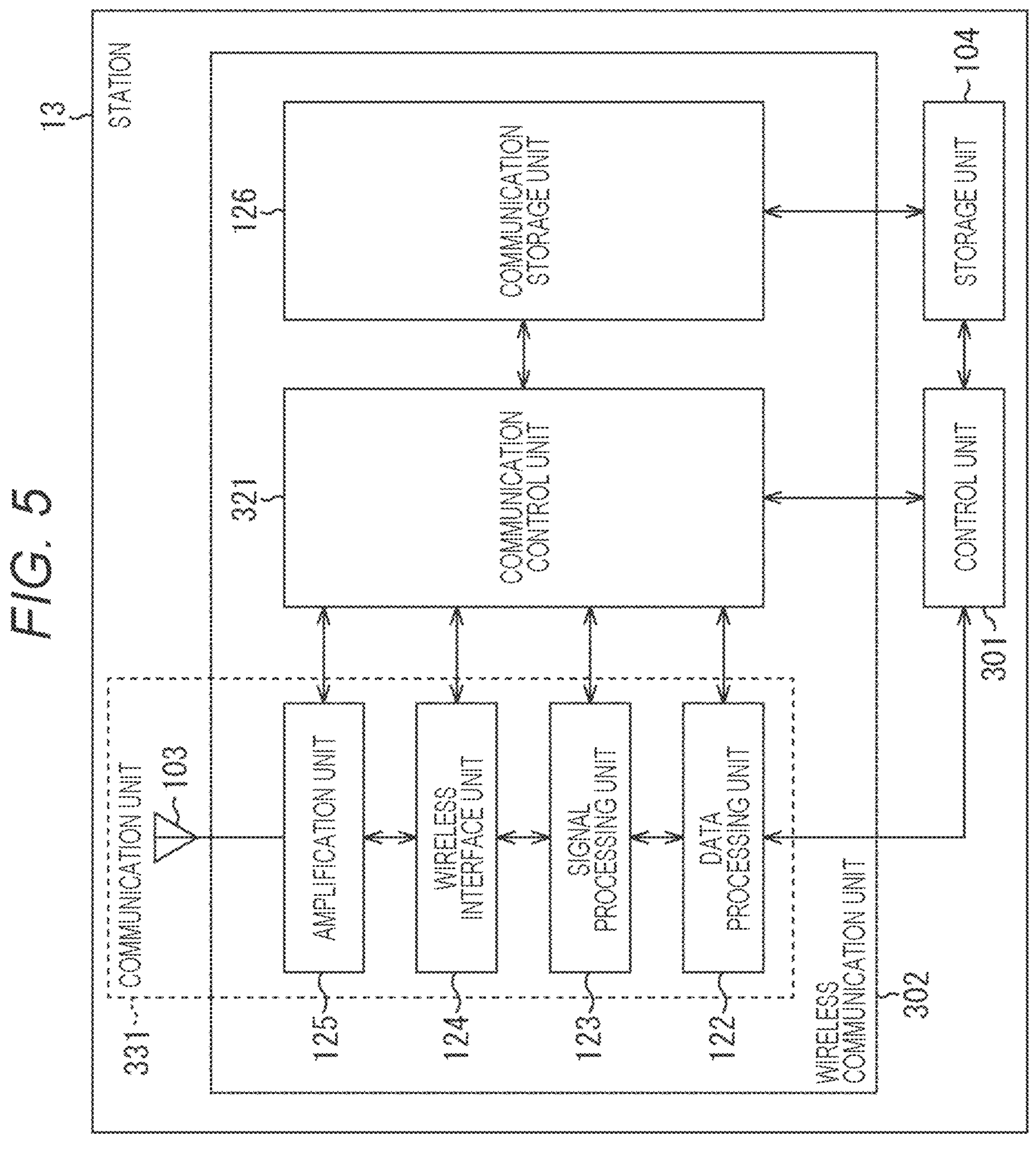
FIG. 5 is a block diagram illustrating a configuration example of an STA.

FIG. 5 illustrates a configuration example of a communication apparatus constituting the STA 13. Note that, in the drawing, portions corresponding to those of the source node 11 in FIG. 2 are denoted by the same reference signs, and the description thereof will be omitted as appropriate.

The STA 13 is different from the source node 11 in that only one set of an antenna 103, a data processing unit 122, a signal processing unit 123, a wireless interface unit 124, and an amplification unit 125 is provided.

Specifically, the STA 13 includes an antenna 103, a storage unit 104, a control unit 301, and a wireless communication unit 302. The wireless communication unit 302 includes a data processing unit 122, a signal processing unit 123, a wireless interface unit 124, an amplification unit 125, a communication storage unit 126, and a communication control unit 321. The antenna 103, the data processing unit 122, the signal processing unit 123, the wireless interface unit 124, and the amplification unit 125 constitute a communication unit 331.

The control unit 301 controls the communication control unit 321 and the data processing unit 122.

The communication control unit 321 controls operation of each unit of the wireless communication unit 302 and information transmission between the units. Furthermore, the communication control unit 321 performs control to transfer control information and management information a notification of which is provided to another communication apparatus to the data processing unit 122.

Note that, for example, the control unit 301 may perform a part of the processing of the communication control unit 321 instead. Furthermore, for example, the control unit 301 and the communication control unit 321 may be integrated into one. Furthermore, for example, the STA 13 may be configured to be able to perform communication of a plurality of frequency channels in parallel.

Sequence Example of Link Setup Phase Corresponding to Non-Patent Document 1

Next, a sequence example of the Link Setup phase in a case where the configuration of Non-Patent Document 1 described above is considered will be described with reference to a sequence diagram of FIG. 6.

First, a backhaul link is set up between the source node and the relay node. The setup here includes Authentication, Association, 802.1X authentication, and 4-way Handshake.

Next, the fronthaul is set up.

First, after Authentication (set encryption by Wired Equivalent Privacy (WEP) or do not do anything) is performed between the relay node and the STA, Association (connection processing) is performed.

Next, the STA transmits an 802.1x authentication request to the authentication node to obtain authentication of the LAN connection.

Here, the authentication node is generally connected to the source node via a WAN (for example, the Internet) in many cases. Therefore, the STA needs to transmit a request signal to the source node via the relay node. In addition, although not illustrated, actually, after information exchange is performed several times between the STA and the authentication node, the STA acquires an 802.1x authentication response signal and acquires a Pairwise Master Key (PMK) which is a public key necessary for generating an encryption key. Here, at least the source node and the STA hold the same PMK information.

Note that in a case where 802.1x authentication is not required and PMK configuration has already been performed, this process is skipped.

Next, the source node and the STA perform 4-way Handshake via the relay node. Here, main information stored in each message is as follows.

Message #1: ANonce (random number generated by Authenticator (source node))

Message #2: SNonce (Supplicant (STA)-generated random number)+Message Integrity Code (MIC, mechanism for verifying integrity in TKIP encryption scheme)

Message #3: ANonce+Group Temporal Key (GTK)+MIC

Message #4: MIC

The source node and the STA generate an encryption key from five pieces of information: its own MAC address, a communication destination MAC address, ANonce, SNonce, and PMK. That is, the STA generates a Pairwise Temporal Key (PTK) managed by the STA itself when receiving the message #1, and the source node generates the PTK when acquiring the message #2. Furthermore, the GTK transmitted in the message #3 is an encryption key for groupcast set by the AP, and is transmitted to the STA by the message #3 in an encrypted state using the PTK generated by the source node. As a result, in a case where all of up to the message #3 have been correctly received, the STA can acquire the encryption key (PTK, GTK) necessary for encryption. The message #4 is transmitted in the role of Ack.

In this sequence, as described above, since 4-way Handshake is performed via the relay node, the number of times of frame transmission increases, and the processing time increases. In particular, in a case where channel statuses are different between the source node and the relay node and between the relay node and the STA, a transmission waiting time is more likely to occur in each link.

In contrast, the present technology presents a method of an encryption key generation process that simplifies processing between the source node and the STA. Specifically, whether to perform 4-way Handshake directly between the source node and the STA or via the relay node is determined on the basis of the communication status between the terminals. Furthermore, in a case where the 4-way Handshake is implemented via the relay node, the encryption key generated between the relay node and the STA is shared with the source node on the basis of the information of the encryption scheme corresponding to each device, thereby reducing the number of times of information exchange.

<Overall Sequence>

Figure 7:
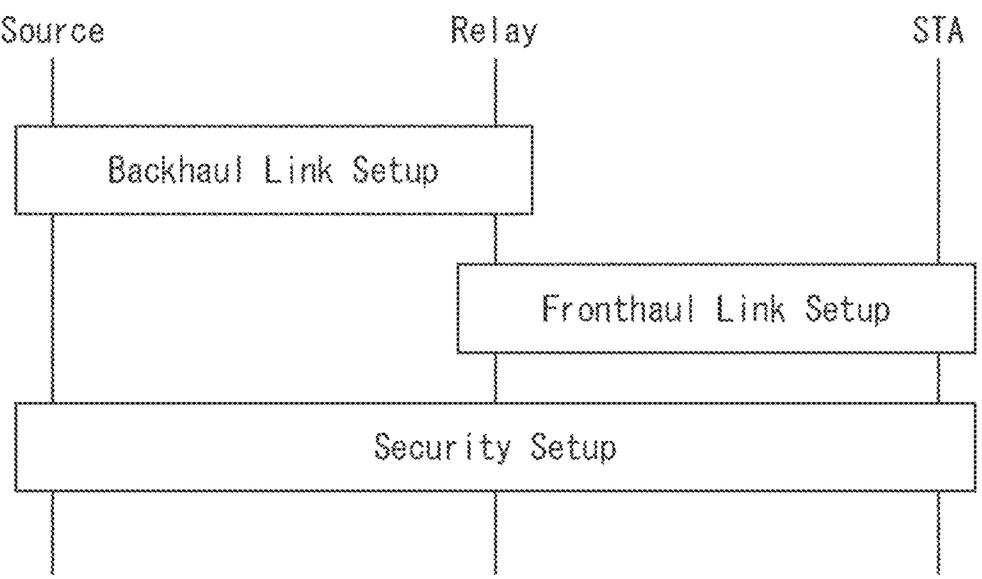
FIG. 7 is a diagram illustrating an overall sequence example of a communication system.

FIG. 7 illustrates an overall sequence in the communication system 1 to which the present technology is applied.

First, Backhaul Link Setup is performed between the source node 11 and the relay node 12.

Next, Fronthaul Link Setup is performed between the relay node 12 and the STA 13.

Next, Security Setup is performed between the source node 11 and the STA 13.

Sequence Example of Backhaul Link Setup Phase

Figure 8:
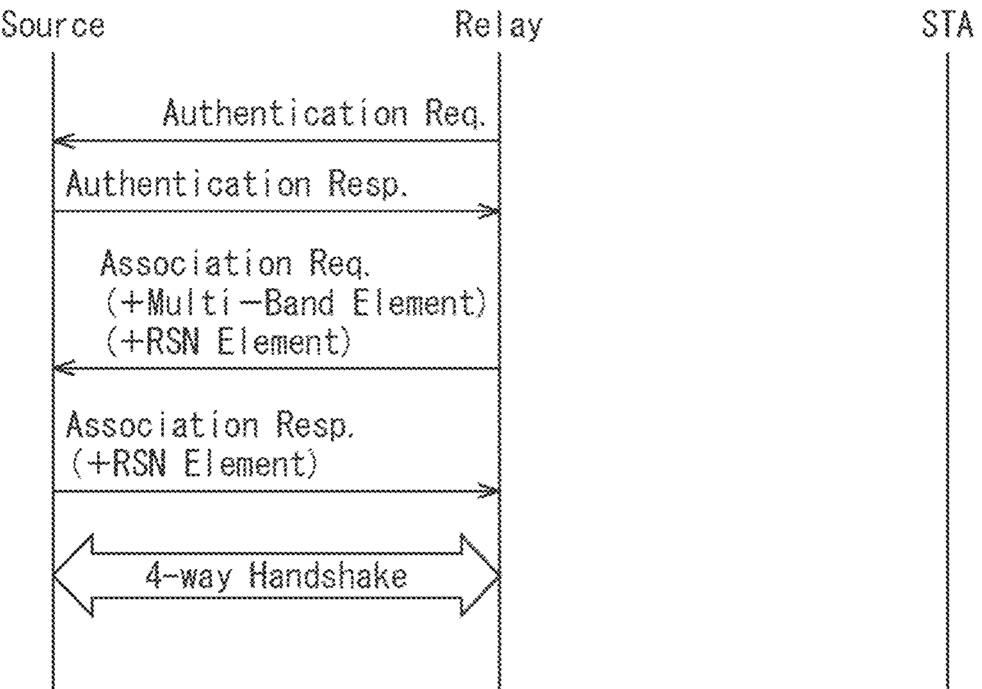
FIG. 8 is a diagram illustrating a sequence example of a Backhaul Link Setup phase.

FIG. 8 illustrates a sequence example in the Backhaul Link Setup phase of FIG. 7.

First, the relay node 12 transmits an Authentication Request to the source node 11.

In contrast, the source node 11 transmits an Authentication Response to the relay node 12.

Next, the relay node 12 transmits an Association Request to the source node 11.

In contrast, the source node 11 transmits an Association Response to the relay node 12.

Then, 4-way Handshake is performed between the source node 11 and the relay node 12.

As described above, in the Backhaul Link Setup phase, an existing frame or information group is used. Then, at least either in the frame exchange of Authentication or Association, a Robust Security Network (RSN) Element is exchanged between the source node 11 and the relay node 12. In addition, a Multi-band Element indicating information regarding a fronthaul link of the relay node 12 is transmitted from the relay node 12 to the source node 11.

Configuration Example of Multi-Band Element

FIG. 9 illustrates a configuration example of a Multi-band Element. Here, a configuration example defined in IEEE 802.11 is illustrated. Specifically, the Multi-band Element includes Element ID, Length, Multi-band Control, Band ID, Operating Class, Channel Number, BSSID, Beacon Interval, TSF Offset, Multi-band Connection Capability, FST Session Timeout, STA MAC Address, Pairwise Cipher Suite Count, and Pairwise Cipher Suite List.

The Pairwise Cipher Suite Count is information indicating the number of types of encryption schemes for one-to-one communication corresponding to other links (in this example, the fronthaul link).

The Pairwise Cipher Suite List is a list of encryption schemes for one-to-one communication corresponding to other links, and is information indicating the number of encryption schemes indicated by Pairwise Cipher Suite Count.

Therefore, a notification of the encryption scheme that can be supported by the relay node 12 on the fronthaul link (between the relay node 12 and the STA 13) is provided to the source node 11 by the Multi-band Element.

Note that the Multi-band Element may have another configuration as long as it includes information similar to the Pairwise Cipher Suite Count and the Pairwise Cipher Suite List. For example, information indicating Multi-Link under discussion in IEEE 802.11be can be used. Furthermore, the Multi-band Element is assumed to be transmitted as a MAC frame, but may be transmitted as a TCP/IP frame.

Configuration Example of RSN Element

Figure 10:
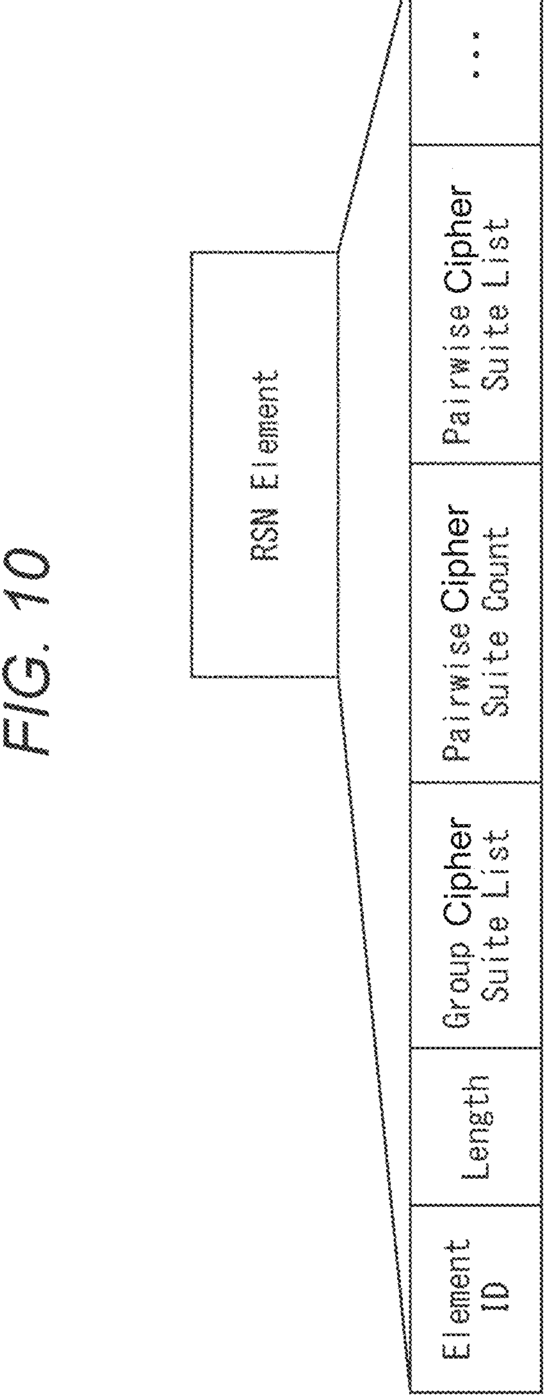
FIG. 10 is a diagram illustrating a configuration example of an RSN Element.

FIG. 10 illustrates a configuration example of an RSN Element. This RSN Element indicates a configuration example defined in IEEE 802.11. The RSN Element includes Element ID, Length, Group Cipher Suite List, Pairwise Cipher Suite Count, and Pairwise Cipher Suite List.

The Element ID is information indicating that this Element is an RSN Element.

The Length is information indicating the length of this Element.

The Group Cipher Suite List is a list of encryption schemes for groupcast corresponding to this link (in this example, a backhaul link).

The Pairwise Cipher Suite Count is information indicating the number of types of encryption schemes for one-to-one communication corresponding to this link.

The Pairwise Cipher Suite List is a list of encryption schemes for one-to-one communication corresponding to this link, and is information indicating the number of encryption schemes indicated by Pairwise Cipher Suite Count.

With this RSN Element, information regarding an encryption scheme that can be supported in the backhaul link (between the source node 11 and the relay node 12) is exchanged between the source node 11 and the relay node 12.

Note that the RSN Element may have another configuration as long as it includes information similar to Group Cipher Suite List, Pairwise Cipher Suite Count, and Pairwise Cipher Suite List. Further, the RSN Element is assumed to be transmitted as a MAC frame, but may be transmitted as a TCP/IP frame.

Sequence Example of Fronthaul Link Setup Phase

Figure 11:
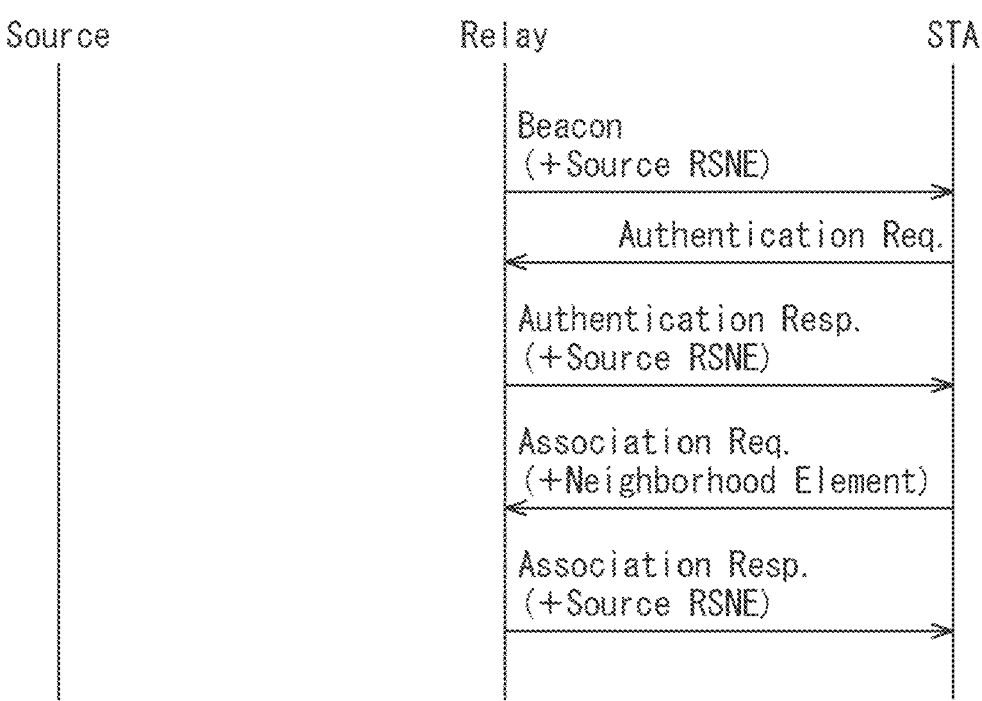
FIG. 11 is a diagram illustrating a sequence example of a Fronthaul Link Setup phase.

FIG. 11 illustrates a sequence example in the Fronthaul Link Setup phase in FIG. 7.

First, the relay node 12 transmits a beacon signal to the STA 13.

In contrast, the STA 13 transmits an Authentication Request to the relay node 12.

In contrast, the relay node 12 transmits an Authentication Response to the STA 13.

Next, the STA 13 transmits an Association Request to the relay node 12.

In contrast, the relay node 12 transmits an Association Response to the STA 13.

Here, the Source RSN Element is stored in at least one of a beacon signal, an Association Response, or an Association Response and transmitted from the relay node 12 to the STA 13.

In addition, the Neighborhood Element is stored in the Association Request and transmitted from the STA 13 to the relay node 12.

Configuration Example of Source RSN Element

Figure 12:
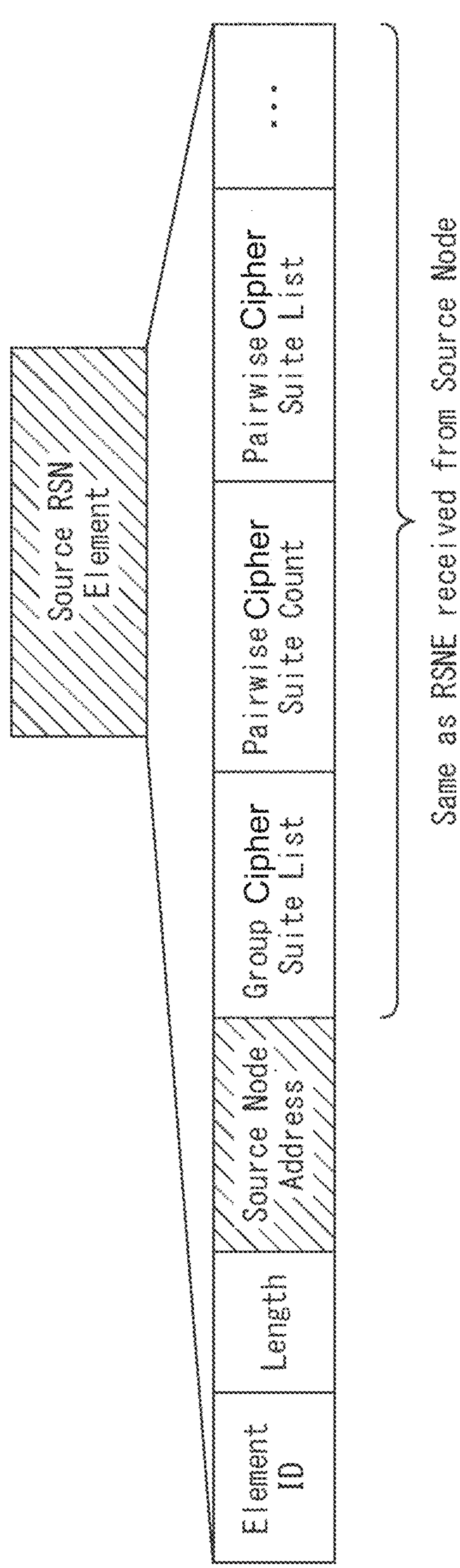
FIG. 12 is a diagram illustrating a configuration example of a Source RSN Element.

FIG. 12 illustrates a configuration example of a Source RSN Element.

The Source RSN Element has a configuration in which a Source Node Address is added to the RSN Element in FIG. 10. Specifically, the Source RSN Element includes an Element ID, a Length, a Source Node Address, a Source RSN Element, a Group Cipher Suite List, a Pairwise Cipher Suite Count, and a Pairwise Cipher Suite List.

The Source Node Address is information indicating a MAC address of the source node 11.

In the information other than the Source Node Address, that is, in the Group Cipher Suite List, the Pairwise Cipher Suite Count, and the Pairwise Cipher Suite List, the information stored in the RSN Element acquired from the source node 11 is used as it is unless there is a particular circumstance.

Note that the Source RSN Element may have another configuration as long as it includes information similar to the Source Node Address. In addition, the Source RSN Element is assumed to be transmitted as a MAC frame, but may be transmitted as a TCP/IP frame.

Configuration Example of Neighborhood Element

FIG. 13 illustrates a configuration example of a Neighborhood Element. The Neighborhood Element indicates a configuration example defined in IEEE 802.11, and includes information indicating a radio wave environment of the STA 13. Specifically, the Neighborhood Element includes Element ID, Length, BSSID, BSSID Information, Operating Class, Channel Number, and PHY Type.

The BSSID is information indicating a BSS number (mainly MAC address) set by the AP observed by the STA 13.

The BSS ID information includes an information group regarding the BSS number set by the AP observed by the STA 13. For example, the BSS ID information includes information such as whether or not a direct signal has arrived, capability, support mode, and the like.

Therefore, the Neighborhood Element makes it possible to determine whether or not the STA 13 can directly communicate with the source node 11.

Note that, similarly to the BSSID and the BSS ID information, the Neighborhood Element may have another configuration as long as it includes information capable of determining whether or not the STA 13 can directly communicate with the source node 11. Further, the Neighborhood Element is assumed to be transmitted as a MAC frame, but may be transmitted as a TCP/IP frame. Note that, for example, in a case where the relay node 12 can acquire the radio wave environment information of the STA 13, the Neighborhood Element does not necessarily need to be transmitted.

First Sequence Example of Security Setup Phase

Figure 14:
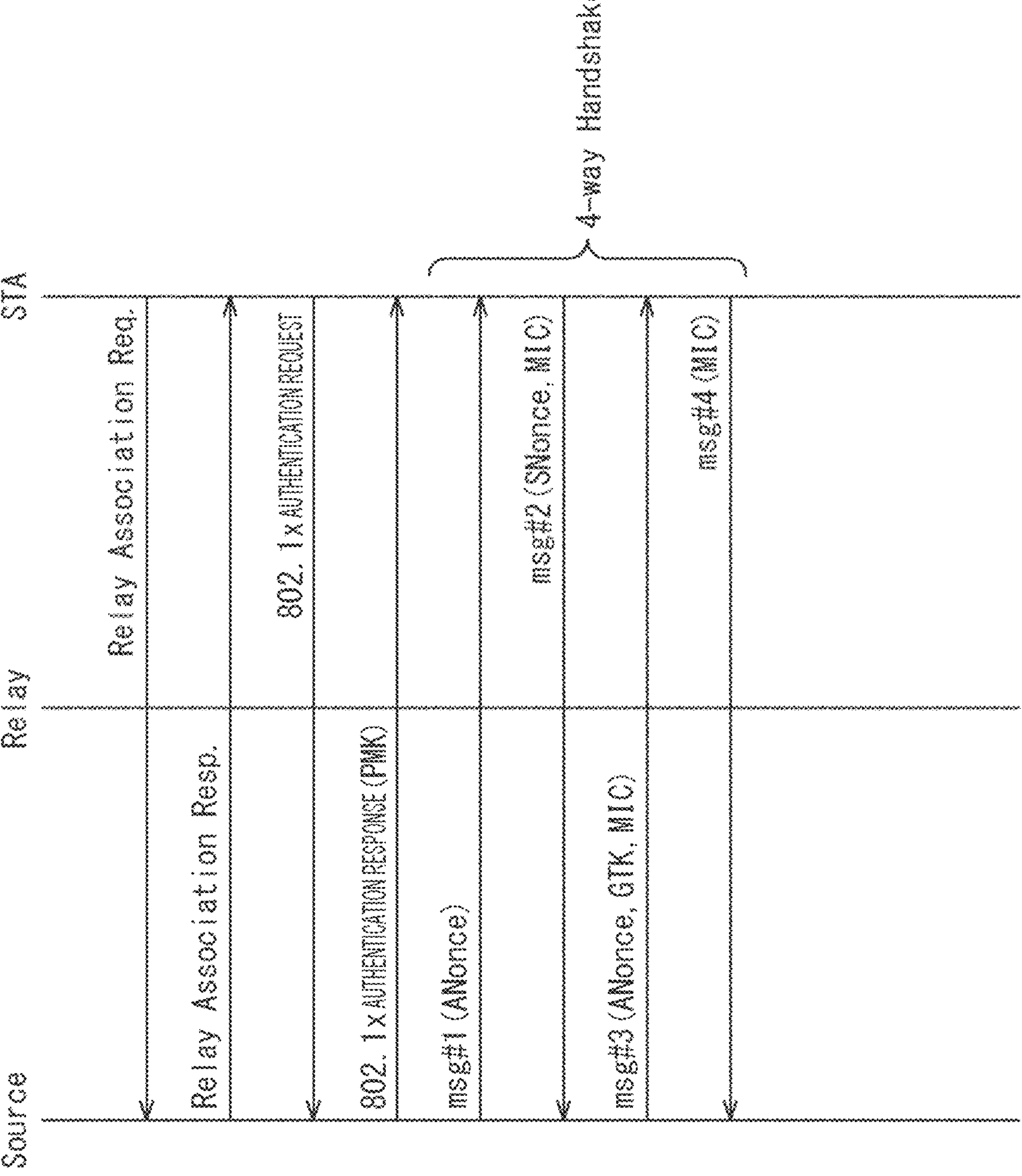
FIG. 14 is a diagram illustrating a first sequence example of a Security Setup phase.

FIG. 14 illustrates a first sequence example of the Security Setup phase in FIG. 7.

This example illustrates a case where the STA 13 determines that direct communication with the source node 11 is possible on the basis of the Source RSNE obtained by the Fronthaul Link Setup phase in FIG. 11 and the radio wave environment information measured by the STA itself.

First, the STA 13 transmits Relay Association Request, which is a connection request signal for relay communication, to the source node 11.

In contrast, the source node 11 transmits Relay Association Response, which is a response signal to the Relay Association Request, to the STA 13.

Figure 6:
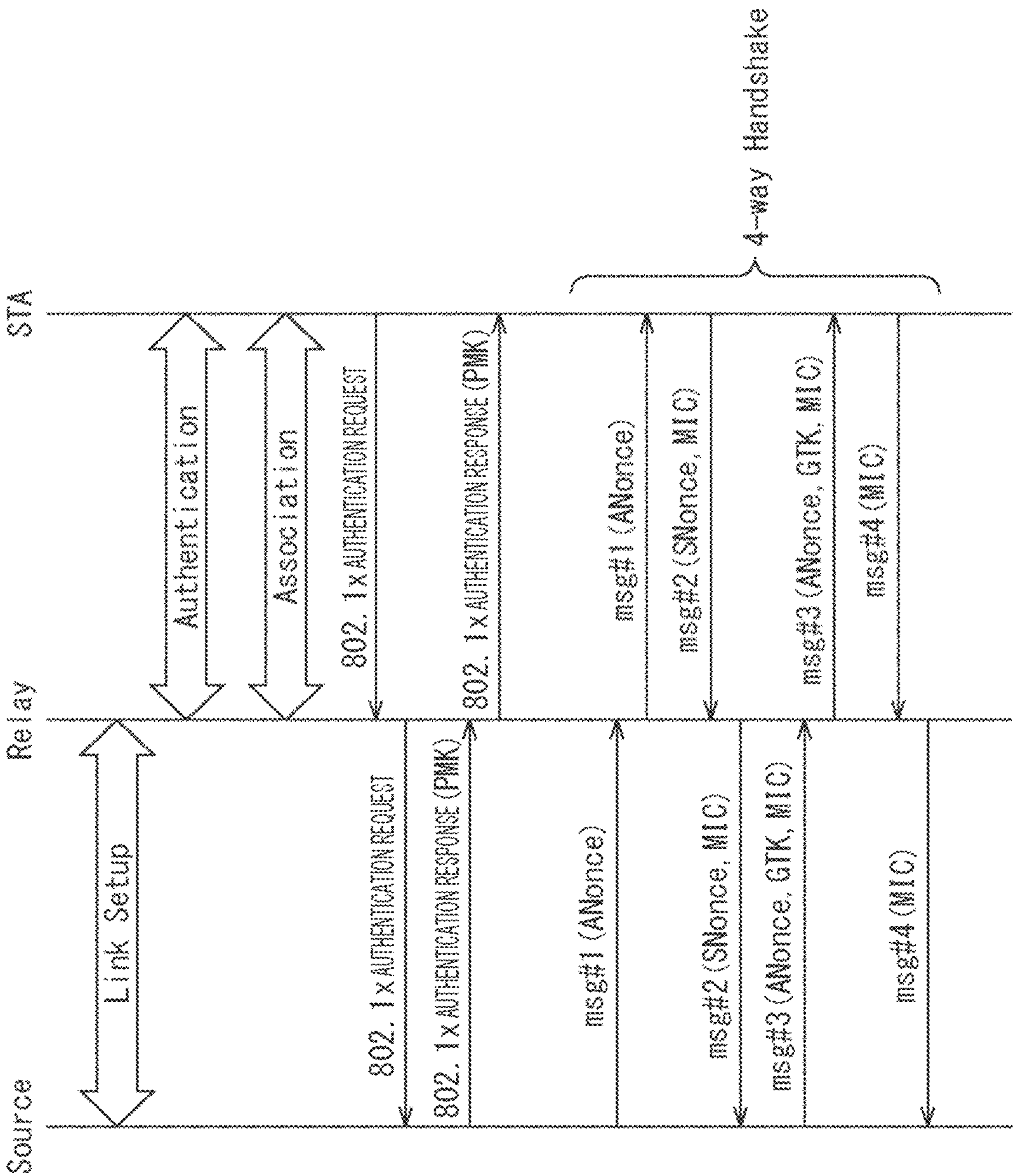
FIG. 6 is a diagram illustrating a sequence example of a conventional Link Setup phase.

Thereafter, processing similar to that after the 802.1x authentication request in FIG. 6 is directly performed between the STA 13 and the source node 11 without passing through the relay node 12.

Second Sequence Example of Security Setup Phase

Figure 15:
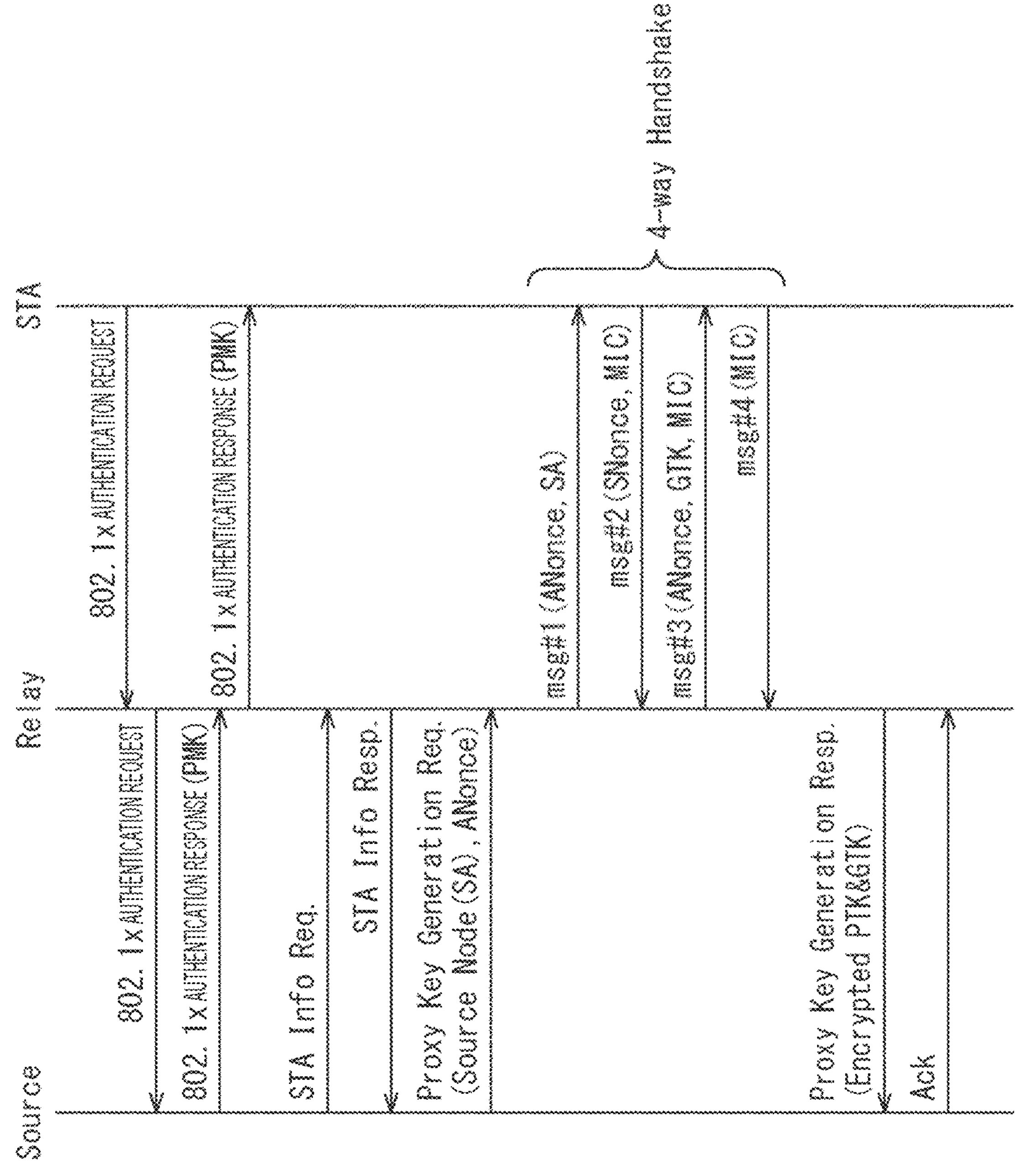
FIG. 15 is a diagram illustrating a second sequence example of a Security Setup phase.

FIG. 15 illustrates a second sequence example of the Security Setup phase.

This example illustrates a case where the STA 13 determines that direct communication with the source node 11 is not possible on the basis of the Source RSNE obtained by the Fronthaul Link Setup phase in FIG. 11 and the radio wave environment information measured by the STA itself.

First, the STA 13 and the source node 11 perform 802.1x authentication via the relay node 12 as in the related art.

Next, the source node 11 transmits a STA Information Request to the relay node 12.

In contrast, the relay node 12 transmits a STA Information Response to the source node 11. As a result, the source node 11 acquires information regarding the STA 13. As described later, the information regarding the STA 13 includes, for example, the RSN information and the Neighborhood information of the STA 13.

Note that, in a case where the information regarding the STA 13 is shared from the relay node 12 to the source node 11 by another method, this process may be skipped.

Next, the source node 11 transmits, to the relay node 12, a Proxy Key Generation Request that is a request signal requesting implementation of 4-way Handshake instead of the source node 11. In this frame, a MAC Address (hereinafter, also referred to as SA) of the source node 11 and an ANonce used at the time of 4-way Handshake are included.

Note that the Proxy Key Generation Request may be stored in the 802.1x authentication response and transmitted.

The relay node 12 starts an encryption key generation process by 4-way Handshake instead of the source node 11 on the basis of the information of the Proxy Key Generation Request.

The 4-way Handshake between the relay node 12 and the STA 13 is different from the conventional 4-way Handshake in that the MAC Address (SA) of the source node 11 is included in the message #1 transmitted by the relay node 12.

Typically, an Authenticator and a Supplicant MAC Address are required for generating an encryption key. In the conventional 4-way Handshake, mutual MAC Addresses are known at the time of connection.

On the other hand, in the present technology, since the relay node 12 generates the encryption key instead of the source node 11, the STA 13 needs to use the MAC Address of the source node 11 when generating the PTK. Therefore, the relay node 12 notifies the STA 13 of the MAC Address of the source node 11 used at the time of generating the PTK using the message #1.

Then, after the generation processing of the encryption key (PTK, GTK) is completed between the relay node 12 and the STA 13, the relay node 12 transmits a Proxy Key Generation Response to the source node 11. The PTK and the GTK generated by 4-way Handshake are stored in this frame. The PTK and the GTK are stored in Proxy Key Generation Response in a state of being encrypted by an encryption scheme already set in the backhaul link in order to enhance safety.

In contrast, the source node 11 returns Ack to the relay node 12.

In this manner, the relay node 12 generates an encryption key between the source node 11 and the STA 13 instead of the source node 11, and the source node 11 and the STA 13 share the encryption key generated by the relay node 12. As a result, it is possible to simplify the 4-way Handshake.

Third Sequence Example of Security Setup Phase

Figure 16:
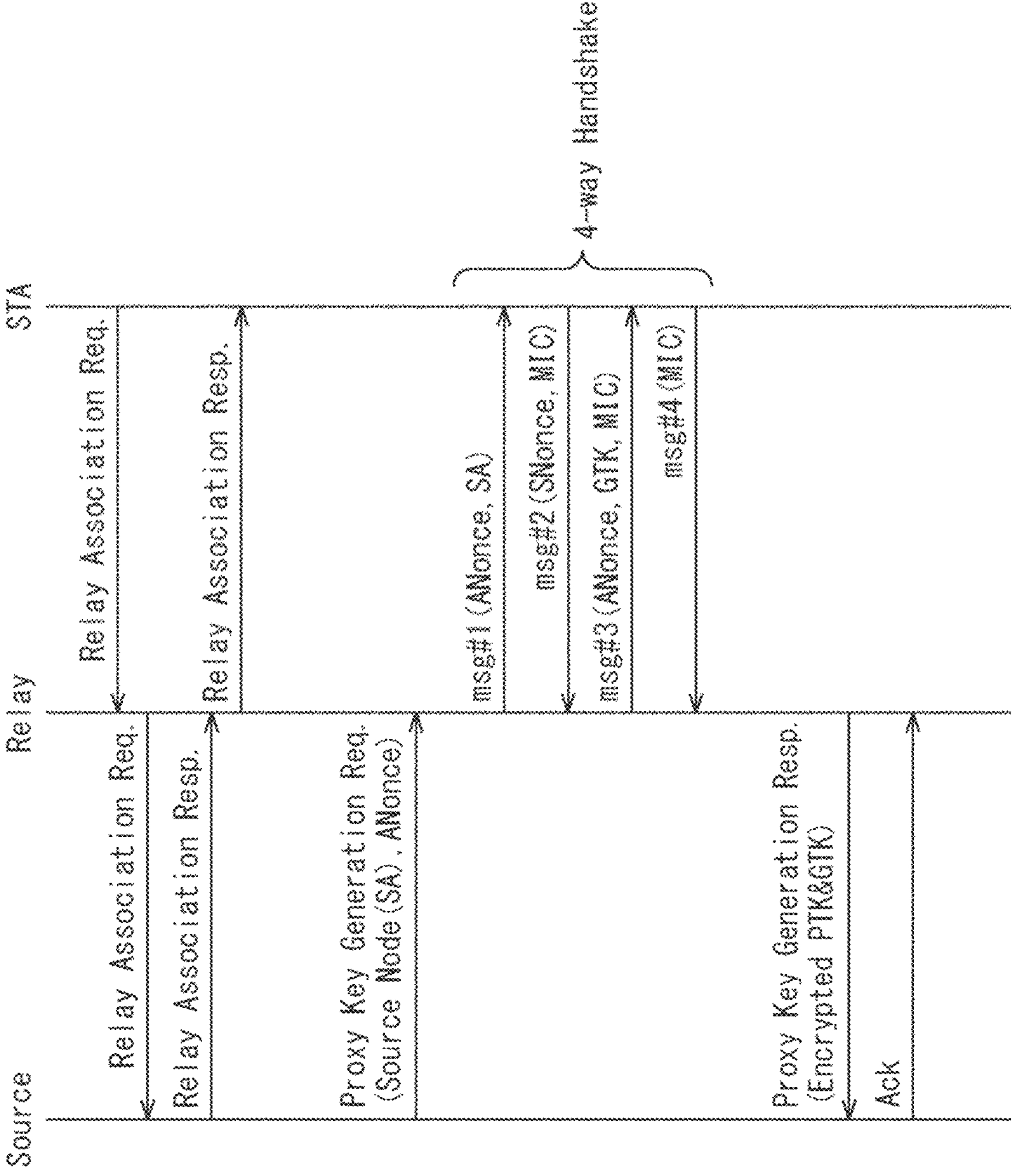
FIG. 16 is a diagram illustrating a third sequence example of a Security Setup phase.

FIG. 16 illustrates a third sequence example of the Security Setup phase.

This example illustrates a sequence example when the STA 13 requests the relay communication setting with the source node 11 again in a case where the 802.1x authentication has already been completed and the PMK has been acquired.

First, a Relay Association Request and a Relay Association Response are exchanged between the STA 13 and the source node 11 via the relay node 12.

Thereafter, processing similar to that after transmission of the Proxy Key Generation Request in FIG. 15 is performed.

First Configuration Example of Relay Association Request/Response

Figure 17:
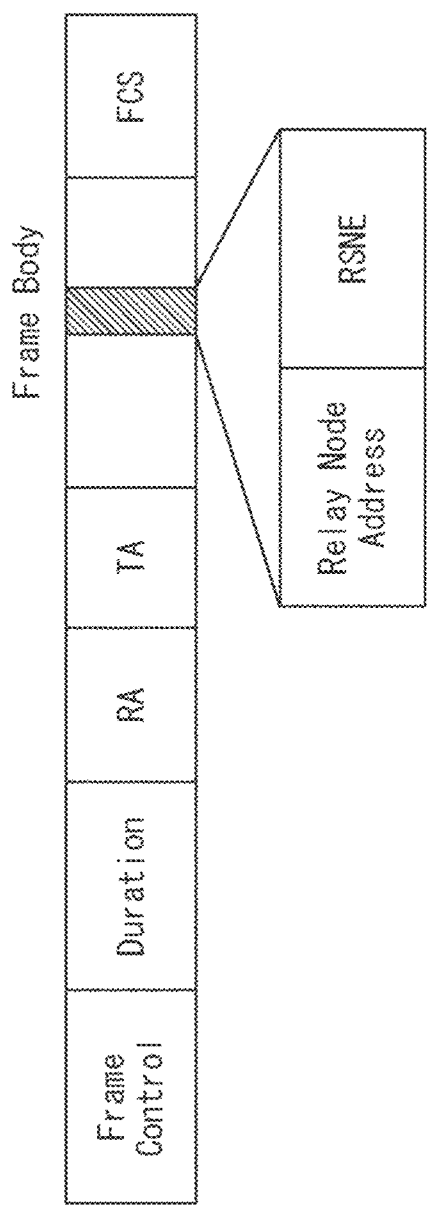
FIG. 17 is a diagram illustrating a first configuration example of Relay Association Request/Response.

FIG. 17 illustrates a first configuration example of Relay Association Request and Relay Association Response. The Relay Association Request and the Relay Association Response are frames based on an Action frame of IEEE 802.11. Specifically, the Relay Association Request and the Relay Association Response include Frame Control, Duration, a Receiver Address (RA), a Transmitter Address (TA), and a Frame Body.

The Frame Control is information indicating the type of frame.

The Duration is information indicating the length of the frame.

The RA is information indicating an address of a transmission destination of a frame.

The TA is information indicating an address of a transmission source of the frame.

The Frame Body includes a body of information to be transmitted.

The FCS is an error correction code.

The Frame Body includes a Relay Node Address and an RSNE.

The Relay Node Address is information indicating an address of the relay node 12.

The RSNE is an RSN information group of the STA 13. Specifically, information similar to the above-described RSN Element illustrated in FIG. 10 is included. Therefore, the RSNE includes information regarding an encryption scheme that can be supported by the STA 13 on the backhaul link (between the STA 13 and the relay node 12).

Note that the Relay Association Request and the Relay Association Response may have other configurations as long as they include information similar to the Relay Node Address and the RSNE. In addition, the Relay Association Request and the Relay Association Response are assumed to be transmitted as MAC frames, but may be transmitted as TCP/IP frames.

Second Configuration Example of Relay Association Request/Response

Figure 18:
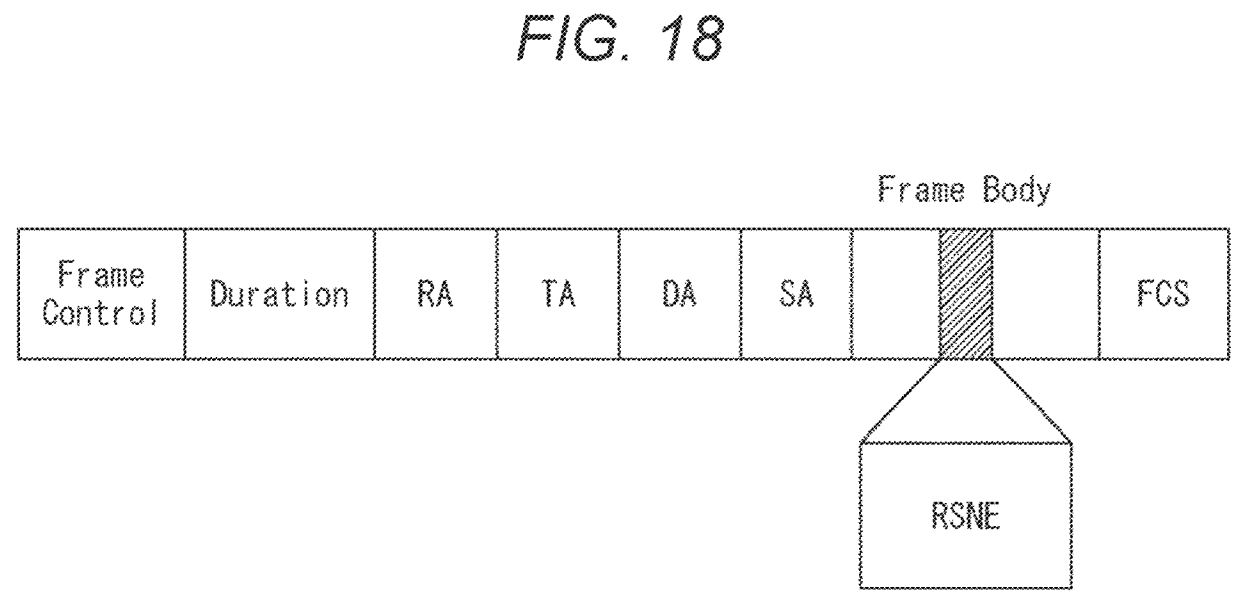

FIG. 18 illustrates a second configuration example of Relay Association Request and Relay Association Response.

The configuration example in FIG. 18 is different from the configuration example in FIG. 17 in that a Destination Address (DA) and a Source Address (SA) are included in a MAC header instead of not including a Relay Node Address in a Frame Body.

The DA is information indicating an address of a node as a final transmission destination.

The SA is information indicating an address of a node of a first transmission source.

For example, in the case of Relay Association Request, when transmission is performed via the relay node 12 as illustrated in FIG. 16, the address of the source node 11 is set in DA, and the address of the STA 13 is set in SA. Therefore, even if the Relay Node Address is not included in the Frame Body, it is clearly indicated which nodes perform relay communication setting.

Configuration Example of Proxy Key Generation Request

Figure 19:
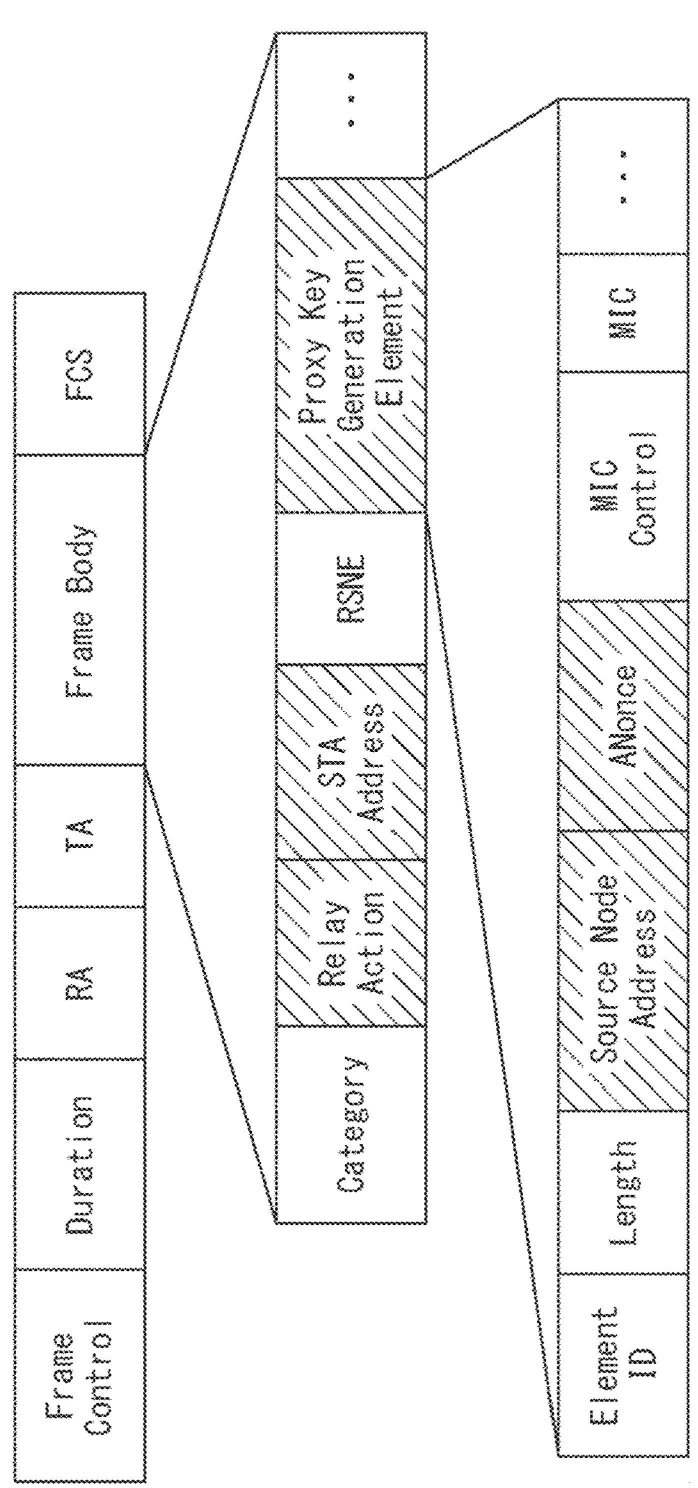
FIG. 19 is a diagram illustrating a configuration example of Proxy Key Generation Request.

FIG. 19 illustrates a configuration example of Proxy Key Generation Request. The Proxy Key Generation Request is a frame based on the Action frame of IEEE 802.11. Specifically, the Proxy Key Generation Request includes Frame Control, Duration, a Receiver Address (RA), a Transmitter Address (TA), and an FCS.

The Frame Control is information indicating the type of frame.

The Duration is information indicating the length of the frame.

The RA is information indicating an address of a transmission destination of a frame.

The TA is information indicating an address of a transmission source of the frame.

The Frame Body is a body of information to be transmitted.

The FCS is an error correction code.

The Frame Body includes Category, Relay Action, STA Address, RSNE, and Proxy Key Generation Element.

The Category is information indicating the type of Action frame.

The Relay Action is information indicating a type in the Relay Action frame. In this example, information indicating Proxy Key Generation Request is included.

The STA Address is information indicating the address of the STA 13 to which 4-way Handshake is to be performed.

The RSNE is an RSN information group of the source node 13. Specifically, information similar to the RSN Element illustrated in FIG. 10 is included.

The Proxy Key Generation Element includes an information group necessary for the relay node 12 to perform an encryption key generation process with the STA 13 instead of the source node 11. Specifically, the Proxy Key Generation Element includes an Element ID, a Length, an ANonce, a Message Integrity Code (MIC) Control, and a MIC.

The Element ID is information indicating that this element is a Proxy Key Generation Element.

The Length is information indicating the length of this element.

The Source Node Address is information indicating the address of the source node 11 used when the STA 13 generates the PTK.

The ANonce is a random number generated by the source node 11 and used at the time of 4-way Handshake.

The MIC Control is information indicating the number of elements included in the subsequent MIC.

The MIC is a message integrity code.

Note that the Proxy Key Generation Request may have another configuration as long as it includes information similar to the Source Node Address and the ANonce. Further, the Proxy Key Generation Request is assumed to be transmitted as a MAC frame, but may be transmitted as a TCP/IP frame.

First Configuration Example of Message #1

Figure 21:
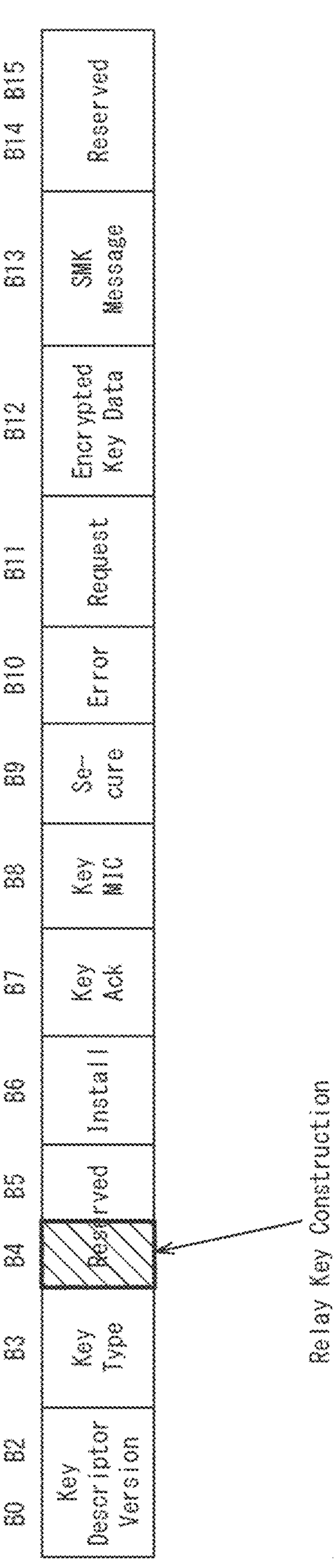
FIG. 21 is a diagram illustrating a first configuration example of a message #1 of 4-way Handshake.

FIGS. 20 and 21 illustrate a first configuration example of the frame used for the message #1 of the 4-way Handshake. In this example, the message #1 has a configuration in which Relay Key Construction and Source Node Address are added to the EAPOL-key frame of 802.11-2016. FIG. 20 illustrates an overall configuration example of the message #1, and FIG. 21 illustrates a configuration example of Key Information of the message #1.

As illustrated in FIG. 21, Relay Key Construction, which is a 1-bit flag, is added to Key Information. Setting Relay Key Construction to 1 instructs the STA 13 to generate a PTK using a subsequently included Source Node Address.

The Source Node Address is information indicating the address of the source node 11 to be used for generation of the PTK in a case where Relay Key Construction=1. Note that the location where the Source Node Address is stored is not limited to this example, and may be stored in Key Data, for example.

Second Configuration Example of Message #1

Figure 22:
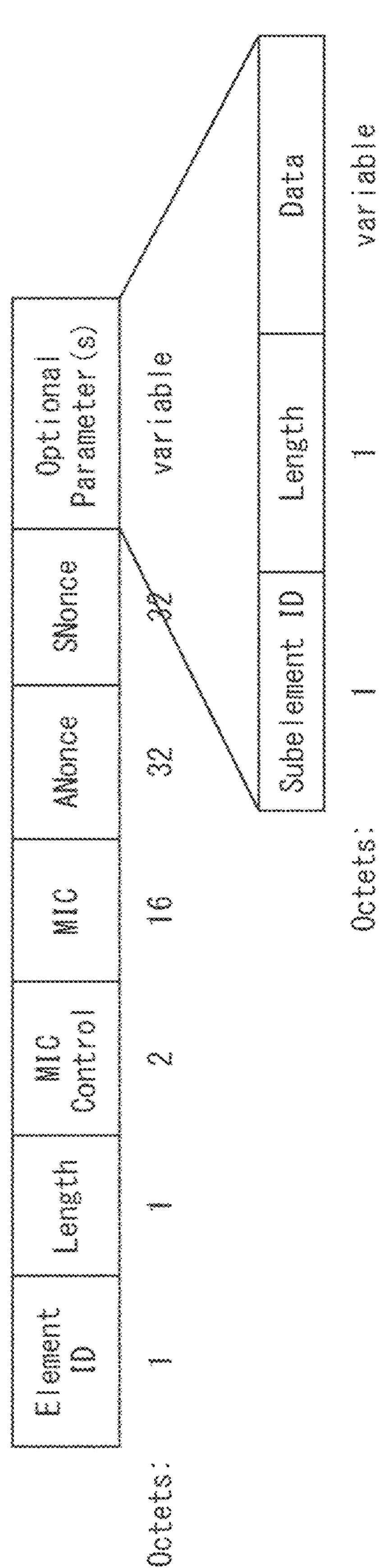
FIG. 22 is a diagram illustrating a second configuration example of a message #1 of 4-way Handshake.

FIGS. 22 and 23 illustrate a second configuration example of the frame used for the message #1 of the 4-way Handshake. In this example, the message #1 has a configuration in which a Source Node Address is added to the correspondence table (FIG. 23) of Sub element IDs (FIG. 22) of Optional parameter(s) of 802.11-2016 Fast Transition (FT) Element.

In a case where the Source Node Address is included in the received Optional parameter(s) of the message #1, the STA 13 generates the PTK by using the address information of the source node 11 indicated by the Source Node Address.

Configuration Example of Proxy Key Generation Response

Figure 24:
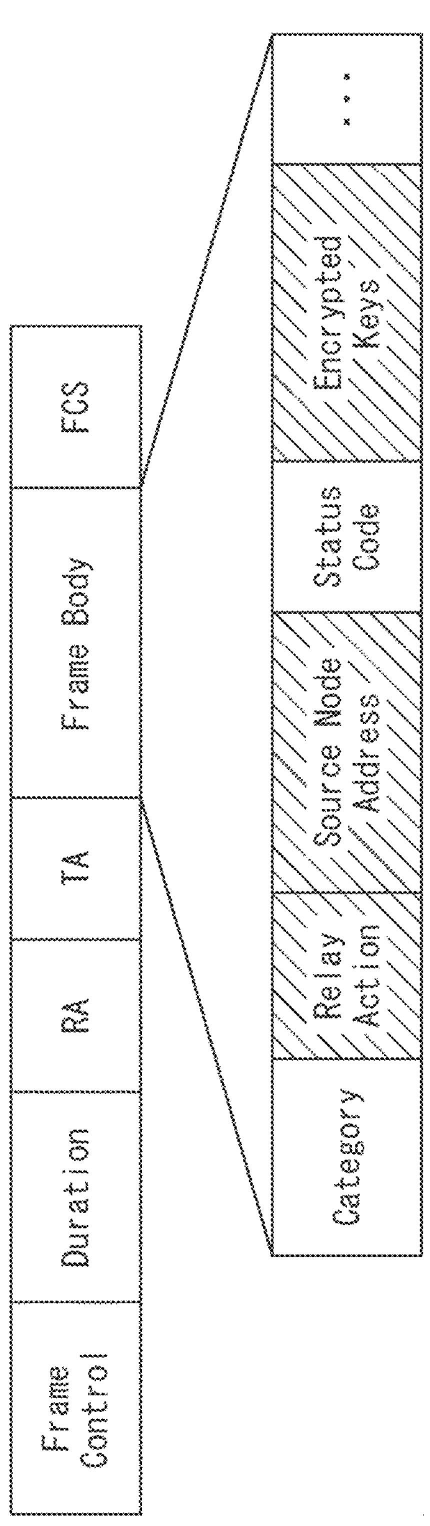
FIG. 24 is a diagram illustrating a configuration example of Proxy Key Generation Response.

FIG. 24 illustrates a configuration example of Proxy Key Generation Response. The Proxy Key Generation Response is a frame based on the Action frame of IEEE 802.11. Specifically, the Proxy Key Generation Response includes Frame Control: Frame, Duration, Receiver Address (RA), Transmitter Address (TA), Frame Body, and FCS.

The Frame Control is information indicating the type of frame.

The Duration is information indicating the length of the frame.

The RA is information indicating an address of a transmission destination of the Proxy Key Generation Response.

The TA is information indicating an address of a transmission source of the Proxy Key Generation Response.

The Frame Body is a body of information to be transmitted.

The FCS is an error correction code.

The Frame Body includes Category, Relay Action, Source Node Address, Status Code, and Encrypted Keys.

The Category is information indicating the type of Action frame. Here, information indicating that the frame is a Relay Action frame is included.

The Relay Action is information indicating a type in the Relay Action frame. In this example, information indicating Proxy Key Generation Response is included.

The Source Node Address is information indicating an address of the source node 11 that is a request source of 4-way Handshake.

The Status Code is information indicating success or failure of 4-way Handshake. In a case where the 4-way Handshake fails, information indicating a cause of the failure may be included.

The Encrypted Keys is information indicating the generated PTG and GTK. The PTK and the GTK are stored in an encrypted state using a predetermined encryption scheme between the source node 11 and the relay node 12.

<Processing of Source Node 11>

Next, processing of the source node 11 in a case where 4-way Handshake processing with the STA 13 is performed starting from the source node 11 will be described with reference to the flowchart of FIG. 25.

In step S1, the wireless communication unit 102 of the source node 11 transmits an STA Information Request to the relay node 12.

In contrast, the relay node 12 receives the STA Information Request and transmits a STA Information Response to the source node 11.

In step S2, the wireless communication unit 102 receives STA Information Response from the relay node 12. As a result, the wireless communication unit 102 acquires the information regarding the STA 13 from the relay node 12. The information regarding the STA 13 includes, for example, RSN information and Neighborhood information of the STA 13.

In step S3, the communication control unit 121 of the wireless communication unit 102 determines whether or not direct communication with the STA 13 is possible on the basis of the radio wave environment information included in the acquired Neighborhood information. In a case where it is determined that direct communication with the STA 13 is not possible, the processing proceeds to step S4.

In step S4, the communication control unit 121 determines an encryption scheme with the STA 13. Specifically, the communication control unit 121 recognizes an encryption scheme that can be supported by the STA 13 on the basis of the RSN information included in the STA Information Response. The communication control unit 121 determines an encryption scheme to be applied in communication with the STA 13 via the front link from among the encryption schemes that can be supported by the STA 13.

In step S5, the communication control unit 121 determines whether or not the relay node 12 can also use the same encryption scheme. Specifically, the communication control unit 121 recognizes an encryption scheme that can be used in the fronthaul link by the relay node 12 on the basis of the Multi-band Element (FIG. 9) acquired from the relay node 12 in the Backhaul Link Setup phase. In a case where the encryption scheme that can be used by the relay node 12 in the fronthaul link includes the encryption scheme that the source node 11 applies in communication with the STA 13, the communication control unit 121 determines that the relay node 12 can also use the same encryption scheme, and the processing proceeds to step S6.

In step S6, the wireless communication unit 102 transmits a Proxy Key Generation (PKG) Request to the relay node 12.

In contrast, the relay node 12 receives a Proxy Key Generation Request and transmits a Proxy Key Generation (PKG) Response to the source node 11.

In step S7, the wireless communication unit 102 receives a Proxy Key Generation (PKG) Response from the relay node 12.

Thereafter, the processing of the source node 11 ends.

On the other hand, in step S5, in a case where the encryption scheme to be applied in the communication with the STA 13 is not included in the encryption schemes that can be used in the fronthaul link by the relay node 12, the communication control unit 121 determines that the relay node 12 cannot use the same encryption scheme, and the processing proceeds to step S8.

In step S8, the wireless communication unit 102 performs 4-way Handshake with the STA 13 via the relay node 12 as illustrated in FIG. 6 described above.

Thereafter, the processing of the source node 11 ends.

On the other hand, in a case where it is determined in step S3 that direct communication with the STA 13 is possible, the processing proceeds to step S9.

In step S9, the wireless communication unit 102 transmits a Relay Association Request to the STA 13.

In contrast, the STA 13 receives the Relay Association Request and transmits a Relay Association Response to the source node 11.

In step S10, the wireless communication unit 102 receives a Relay Association Response from the STA 13.

In step S11, the wireless communication unit 102 directly performs 4-way Handshake with the STA 13 as illustrated in FIG. 14 described above.

Thereafter, the processing of the source node 11 ends.

Note that, although not illustrated in FIG. 25, the source node 11 may determine whether or not to request implementation of the encryption key generation process on the basis of the Capability information of the relay node 12.

<Processing of Relay Node 12>

Next, processing performed by the relay node 12 corresponding to the processing of the source node 11 in FIG. 25 will be described with reference to the flowchart in FIG. 26.

In step S31, the wireless communication unit 202 of the relay node 12 receives the STA Information Request transmitted from the source node 11 in the processing in step S1 of FIG. 25.

In step S32, the wireless communication unit 202 transmits STA Information Response to the source node 11.

In step S33, the wireless communication unit 202 determines whether or not a Proxy Key Generation (PKG) Request is received from the source node 11. In a case where the wireless communication unit 202 determines that the Proxy Key Generation Request transmitted from the source node 11 is received in the processing of step S6 of FIG. 25, the processing proceeds to step S34.

In step S34, the wireless communication unit 202 performs 4-way Handshake with the STA 13 as illustrated in FIG. 15 described above.

In step S35, the wireless communication unit 202 transmits a Proxy Key Generation (PKG) Response to the source node 11.

Thereafter, the processing of the relay node 12 ends.

On the other hand, in a case where it is determined in step S33 that a Proxy Key Generation (PKG) Request has not been received from the source node 11, the processing of the relay node 12 ends.

Figure 26:
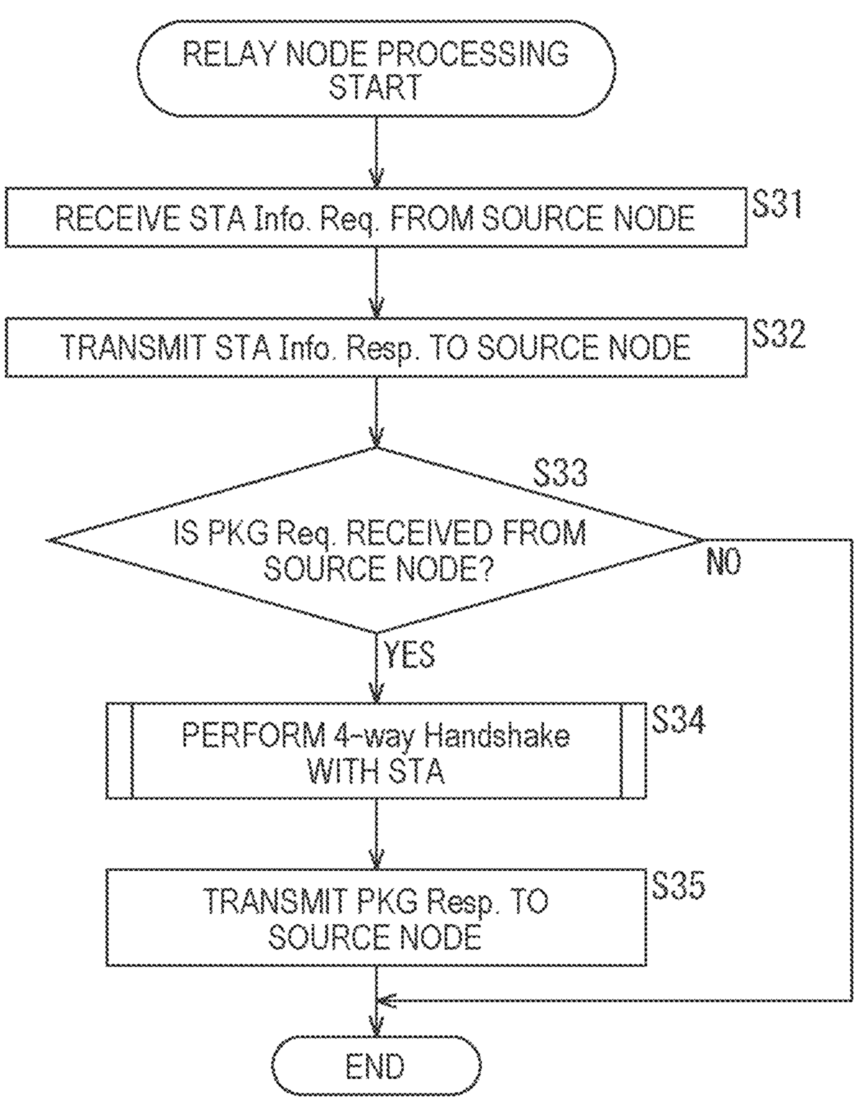
FIG. 26 is a flowchart for explaining a first example of processing of a relay node.

Note that, although not illustrated in FIG. 26, the relay node 12 can reject the request for execution of the encryption key generation process on the basis of its own Capability information.

<Processing of STA 13>

Next, processing performed by the STA 13 corresponding to the processing of the source node 11 in FIG. 25 and the processing of the relay node 12 in FIG. 26 will be described with reference to the flowchart in FIG. 27.

In step S61, the wireless communication unit 302 of the STA 13 determines whether or not a Relay Association Request has been received from the source node 11. In a case where it is determined that the Relay Association Request has not been received from the source node 11, the processing proceeds to step S62.

In step S62, the wireless communication unit 302 determines whether or not the message #1 of the 4-way Handshake has been received. In a case where it is determined that the message #1 has not been received, the processing returns to step S61.

Thereafter, the processing of steps S61 and S62 is repeatedly performed until it is determined in step S61 that the Relay Association Request has been received from the source node 11 or it is determined in step S62 that the message #1 has been received.

On the other hand, in step S62, in a case where the wireless communication unit 302 determines that the message #1 transmitted from the source node 11 in the processing of step S11 of FIG. 25 or the message #1 transmitted from the relay node 12 in the processing of step S34 or step S36 of FIG. 26 is received, the processing proceeds to step S63.

In step S63, the communication control unit 321 of the wireless communication unit 302 confirms the transmission source of the message #1 and determines whether or not the message is from the source node 11. In a case where it is determined that the message is not from the source node 11, in other words, in a case where it is determined that the message is from the relay node 12, the processing proceeds to step S64.

In step S64, the communication control unit 321 determines whether or not the address information of the source node 11 is included. For example, in a case where the information indicating the address (MAC Address) of the source node 11 or the suggesting information is included in the message #1, the communication control unit 321 determines that the address information of the source node 11 is included, and the processing proceeds to step S65.

In step S65, the communication control unit 321 generates the PTK by using the address information (that is, the MAC Address of the source node 11) of the source node 11.

Thereafter, the processing proceeds to step S67.

In a case where it is determined in step S64 that the address information of the source node 11 is not included, the processing proceeds to step S66.

In step S66, the communication control unit 321 generates the PTK using the address information (that is, the MAC Address of the relay node 12) of the relay node 12. Here, a notification of the address information of the relay node 12 is provided from the relay node 12 and stored in the Fronthaul Link Setup phase in FIG. 11, for example.

Thereafter, the processing proceeds to step S67.

In step S67, the wireless communication unit 302 continues 4-way Handshake with the relay node 12 as illustrated in FIG. 6 or FIG. 15 described above.

Thereafter, the processing of the STA 13 ends.

On the other hand, in step S61, in a case where the wireless communication unit 302 determines that the Relay Association Request transmitted from the source node 11 is received in the processing of step S9 of FIG. 25, the processing proceeds to step S68.

In step S68, the wireless communication unit 302 transmits a Relay Association Response to the source node 11.

Thereafter, the processing proceeds to step S69.

On the other hand, in a case where it is determined in step S63 that the message is from the source node 11, the processing proceeds to step S69.

In step S69, the wireless communication unit 302 directly performs 4-way Handshake with the source node 11 as illustrated in FIG. 14 described above.

Thereafter, the processing of the STA 13 ends.

<Processing of STA 13>

Next, processing of the STA 13 in a case where the 4-way Handshake process with the source node 11 is performed starting from the STA 13 will be described with reference to the flowchart of FIG. 28.

In step S101, the communication control unit 321 of the STA 13 determines whether or not direct communication with the source node 11 is possible on the basis of the radio wave environment information or the like measured by the STA 13 itself. In a case where it is determined that direct communication with the source node 11 is possible, the processing proceeds to step S102.

In step S102, the wireless communication unit 302 directly transmits a Relay Association Request to the source node 11.

In contrast, the source node 11 receives the Relay Association Request and transmits the Relay Association Response.

In step S103, the wireless communication unit 302 receives the Relay Association Response directly from the source node 11.

In step S104, similarly to the processing in step S69 in FIG. 27, 4-way Handshake is directly performed with the source node 11.

Thereafter, the processing of the STA 13 ends.

On the other hand, in a case where it is determined in step S101 that direct communication with the source node 11 is not possible, the processing proceeds to step S105.

In step S105, the wireless communication unit 302 transmits a Relay Association Request to the source node 11 via the relay node 12.

In contrast, the source node 11 receives a Relay Association Request and transmits a Relay Association Response via the relay node 12.

In step S106, the wireless communication unit 302 receives a Relay Association Response from the source node 11 via the relay node 12.

In step S107, the wireless communication unit 302 receives the message #1 of the 4-way Handshake.

Thereafter, in steps S108 to S111, processing similar to steps S64 to S67 in FIG. 27 is performed, and the processing of the STA 13 ends.

<Processing of Relay Node 12>

Next, processing performed by the relay node 12 corresponding to the processing of the STA 13 in FIG. 28 will be described with reference to the flowchart in FIG. 29.

In step S131, the wireless communication unit 202 of the relay node 12 relays the Relay Association Request and the Relay Association Response between the STA 13 and the source node 11. Specifically, the wireless communication unit 202 receives the Relay Association Request transmitted from the STA 13 in step S105 of FIG. 28, and transmits the Relay Association Request to the source node 11. Furthermore, the wireless communication unit 202 receives the Relay Association Response transmitted from the source node 11 in step S165 of FIG. described later, and transmits the Relay Association Response to the STA 13.

Thereafter, in steps S132 to S135, processing similar to that in steps S33 to S36 in FIG. 26 is performed, and the processing of the relay node 12 ends.

<Processing of Source Node 11>

Next, processing performed by the source node 11 corresponding to the processing of the STA 13 in FIG. 28 and the processing of the relay node 12 in FIG. 29 will be described with reference to the flowchart in FIG. 30.

Figure 28:
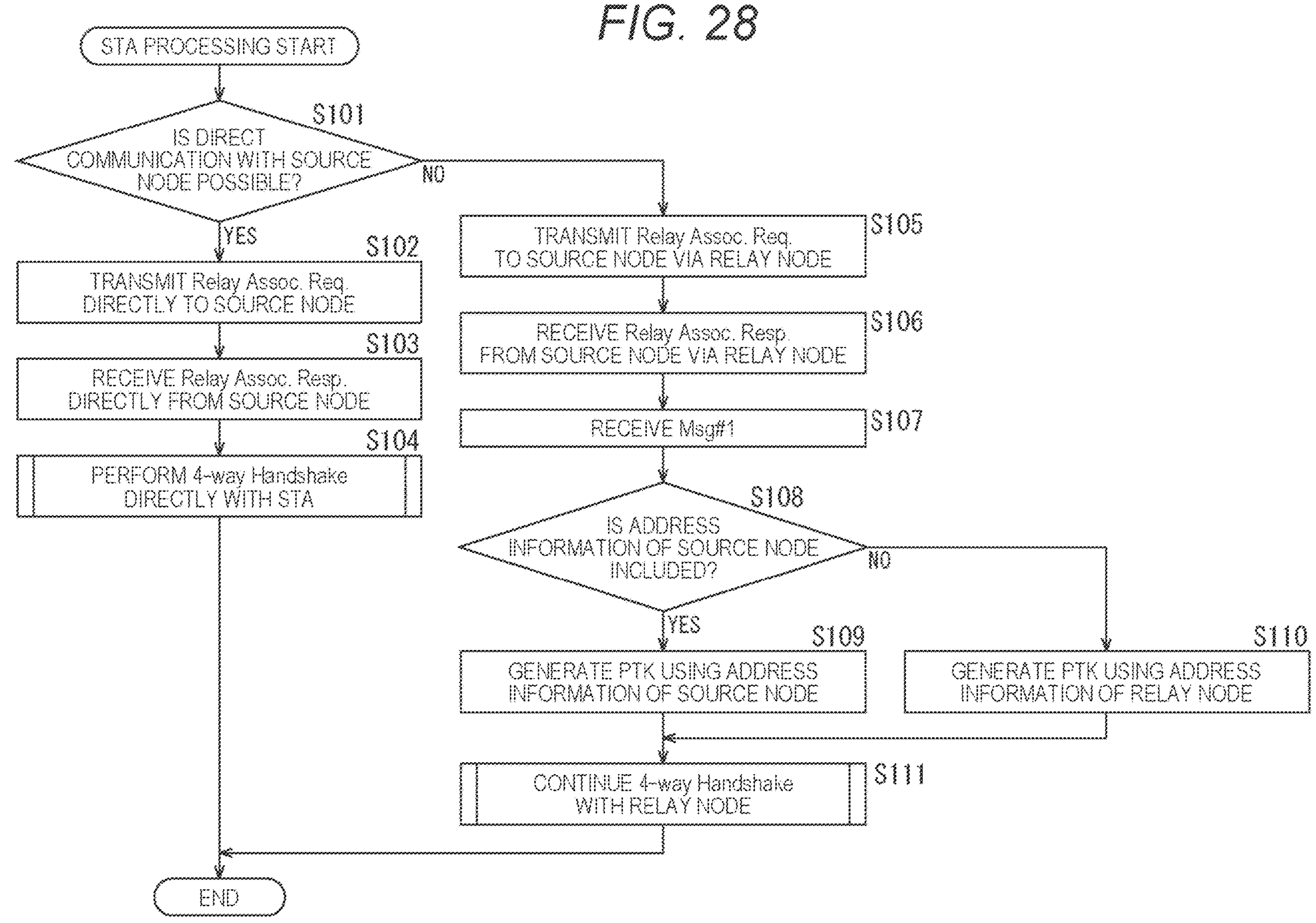
FIG. 28 is a flowchart for explaining a second example of processing of an STA.
Figure 29:
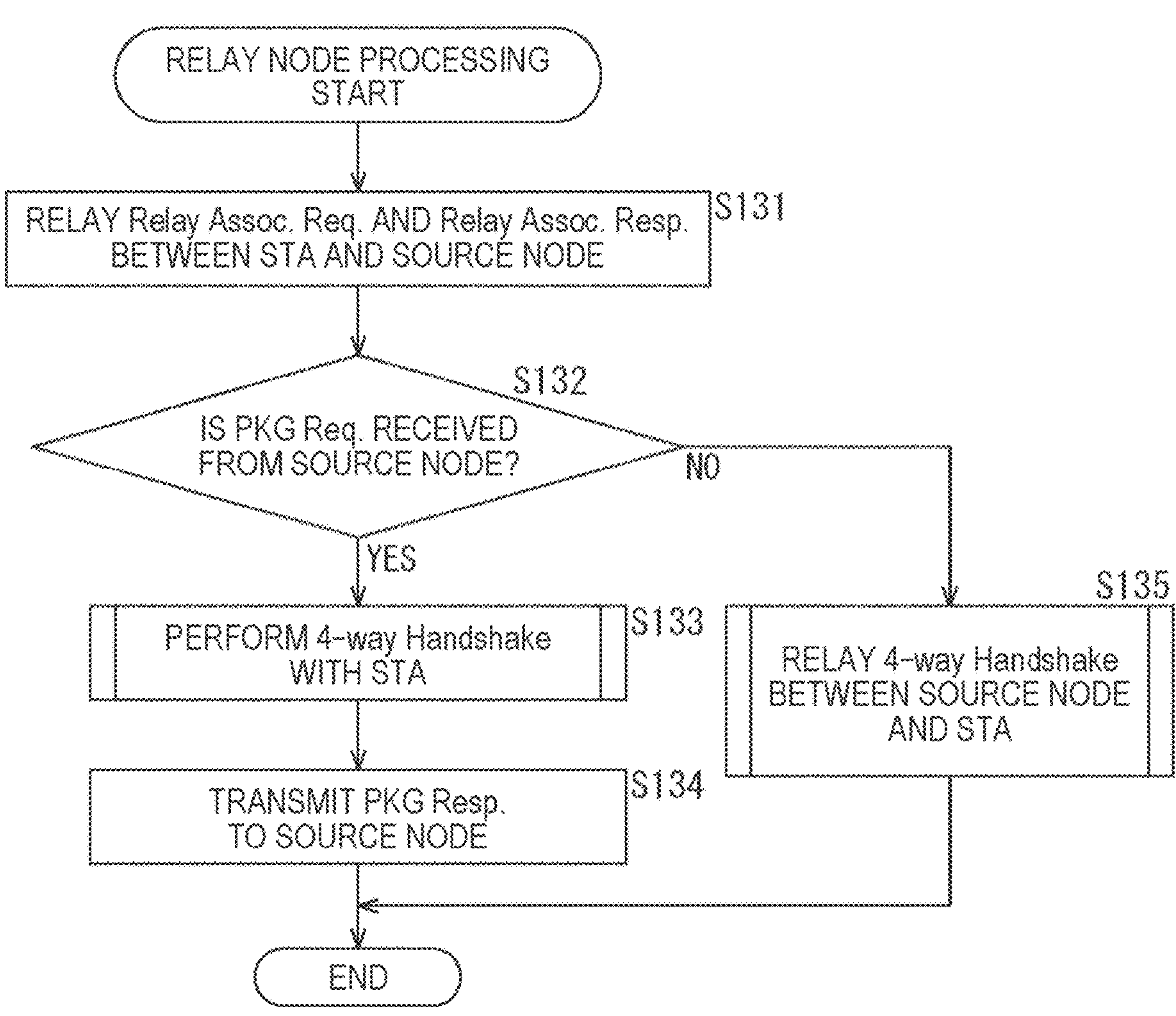
FIG. 29 is a flowchart for explaining a second example of processing of a relay node.

In step S161, the wireless communication unit 102 of the source node 11 receives the Relay Association Request transmitted from the STA 13 in step S102 of FIG. 28 or the Relay Association Request transmitted from the STA 13 in step S105 of FIG. 28 and relayed by the relay node 12 in step S131 of FIG. 29.

In step S162, the communication control unit 121 of the wireless communication unit 102 determines whether or not the Relay Association Request has been directly transmitted from the STA 13. In a case where it is determined that the Relay Association Request is directly transmitted from the STA 13, the processing proceeds to step S163.

In step S163, the wireless communication unit 102 directly transmits Relay Association Response to the STA 13.

In step S164, similarly to the processing of step S11 of FIG. 25, 4-way Handshake is directly performed with the STA 13.

Thereafter, the processing of the source node 11 ends.

On the other hand, in a case where it is determined in step S162 that the Relay Association Request has not been directly transmitted from the STA 13, that is, in a case where it is determined that the Relay Association Request has been transmitted via the relay node 12, the processing proceeds to step S165.

In step S165, the wireless communication unit 102 transmits a Relay Association Response to the STA 13 via the relay node 12.

Thereafter, in steps S166 to S170, processing similar to that in steps S4 to S8 in FIG. 25 is performed, and the processing of the source node 11 ends.

As described above, the 4-way Handshake can be simplified. That is, it is possible to directly perform 4-way Handshake between the source node 11 and the STA 13 according to the radio wave environment between the source node 11 and the STA 13. Furthermore, even if the source node 11 and the STA 13 cannot directly communicate with each other, the relay node 12 can perform 4-way Handshake instead of the source node 11. As a result, the processing time of 4-way Handshake is shortened, and the reliability of information exchange is improved.

«2. Modifications»

Hereinafter, modifications of the above-described embodiments of the present technology will be described.

For example, a communication method other than the wireless LAN can be applied to the backhaul link. For example, wired communication can be applied to the backhaul link, or wireless communication of other methods such as millimeter waves can be applied. In this case, the PTK and the GTK are encrypted by the encryption scheme corresponding to the communication standard applied to the backhaul link and transmitted by the Proxy Key Generation Response.

For example, even in a case where the source node 11 can directly communicate with the STA 13, the relay node 12 may be requested to perform 4-way Handshake. Also in this case, it is possible to simplify 4-way Handshake as compared with a case where 4-way Handshake is always performed via the relay node 12.

The present technology can also be applied to, for example, a case where the source node 11 and the STA 13 perform an encryption key generation process other than 4-way Handshake via the relay node 12.

The configuration of the communication system 1 in FIG. 1 is an example, and can be arbitrarily changed. For example, the number of the source node 11, the number of the relay nodes 12, and the number of the STAs 13 can be changed. For example, it is possible to provide two or more relay nodes 12 between the source node 11 and the STA 13.

<<3. Others>>

Configuration Example of Computer

The above-described series of processing can be performed by hardware or software. In a case where the series of processing is performed by software, a program constituting the software is installed in a computer. Here, the computer includes a computer incorporated in dedicated hardware, a general-purpose personal computer capable of implementing various functions by installing various programs, and the like, for example.

Figure 31:
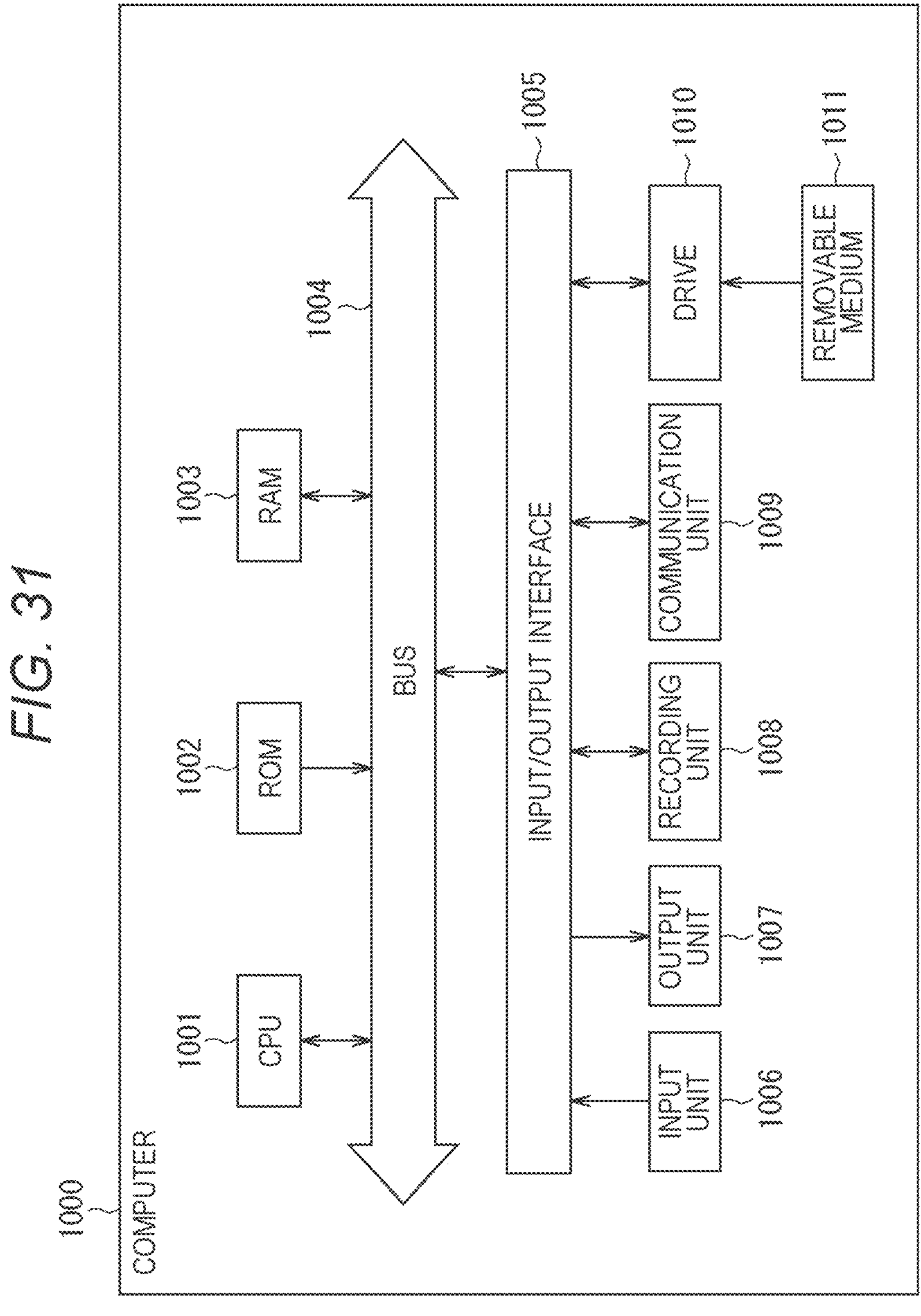
FIG. 31 is a block diagram illustrating a configuration example of a computer.

FIG. 31 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disc, a magneto-optical disk, or a semiconductor memory.

In the computer 1000 configured as described above, for example, the CPU 1001 loads a program recorded in the recording unit 1008 into the RAM 1003 via the input/output interface 1005 and the bus 1004 and executes the program, whereby the above-described series of processing is performed.

The program executed by the computer 1000 (CPU 1001) can be provided by being recorded in the removable medium 1011 as a package medium or the like, for example. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via a wired or wireless transmission medium and installed in the recording unit 1008. Furthermore, the program can be installed in advance in the ROM 1002 or the recording unit 1008.

Note that the program executed by the computer may be a program in which processing is performed in time series in the order described in the present specification, or may be a program in which processing is performed in parallel or at necessary timing such as when a call is made.

Furthermore, in the present specification, a system is intended to mean assembly of a plurality of components (devices, modules (parts), and the like) and it does not matter whether or not all the components are in the same housing. Therefore, a plurality of devices housed in separate housings and connected via a network and one device in which a plurality of modules is housed in one housing are both systems.

Moreover, the embodiments of the present technology are not limited to the above-described embodiments, and various modifications can be made without departing from the gist of the present technology.

For example, the present technology may be configured as cloud computing in which a function is shared by a plurality of devices via the network to process together.

Furthermore, each step described in the above-described flowchart can be performed by one device or can be shared and performed by a plurality of devices.

Furthermore, in a case where a plurality of processes is included in one step, the plurality of processes included in the one step can be performed by one device or can be shared and performed by a plurality of devices.

Combination Examples of Configurations

The present technology may also have the following configurations.

(1)

A communication apparatus including a communication unit that communicates with a wireless terminal via a relay device, in which the communication unit controls execution of an encryption key generation process of generating an encryption key used for communication with the wireless terminal on the basis of at least one of whether or not direct communication with the wireless terminal is possible or an encryption scheme that can be supported by the relay device.

(2)

The communication apparatus according to (1), in which the communication unit performs the encryption key generation process directly with the wireless terminal in a case where direct communicate with the wireless terminal is possible.

(3)

The communication apparatus according to (2), in which in a case where direct communicate with the wireless terminal is not possible, the communication unit requests the relay device to perform the encryption key generation process when the encryption scheme applied to the communication unit with the wireless terminal is an encryption scheme that can be used by the relay device with the wireless terminal, and performs the encryption key generation process with the wireless terminal via the relay device when the encryption scheme applied to the communication unit with the wireless terminal is not an encryption scheme that can be used by the relay device with the wireless terminal.

(4)

The communication apparatus according to (3), in which in a case of requesting the relay device to perform the encryption key generation process, the communication unit generates a random number, transmits a request signal to the relay device, the request signal being a signal that requests the relay device to perform the encryption key generation process with the wireless terminal and including address information of the communication apparatus and the random number, and receives a response signal including the encryption key generated by the encryption key generation process from the relay device using the address information and the random number.

(5)

The communication apparatus according to any one of (2) to (4), in which the communication unit directly transmits a connection request signal for relay communication to the wireless terminal before directly performing the encryption key generation process with the wireless terminal.

(6)

The communication apparatus according to any one of (1) to (5), in which the communication unit determines whether or not direct communication with the wireless terminal is possible on the basis of at least one of radio wave environment information of the wireless terminal or a transmission source of a signal received.

(7)

The communication apparatus according to (6), in which the communication unit acquires, from the relay device, the radio wave environment information of the wireless terminal and information regarding the encryption scheme that can be supported by the wireless terminal before determining a method of the encryption key generation process.

(8)

The communication apparatus according to (1), in which the communication unit requests the relay device to perform the encryption key generation process in a case where the encryption scheme applied to the communication unit with the wireless terminal is an encryption scheme that can be used by the relay device with the wireless terminal, and performs the encryption key generation process with the wireless terminal via the relay device in a case where the encryption scheme applied to the communication unit with the wireless terminal is not an encryption scheme that can be used by the relay device with the wireless terminal.

(9)

A communication method in which a communication apparatus that communicates with a wireless terminal via a relay device is configured to control execution of an encryption key generation process of generating an encryption key used for communication with the wireless terminal on the basis of at least one of whether or not direct communication with the wireless terminal is possible or an encryption scheme that can be supported by the relay device.

(10)

A communication apparatus including a communication unit that relays communication between a radio base station and a wireless terminal, in which in a case of being requested by the radio base station to perform an encryption key generation process of generating an encryption key used by the radio base station for communication with the wireless terminal, the communication unit performs the encryption key generation process with the wireless terminal and transmits the encryption key generated by the encryption key generation process to the radio base station.

(11)

The communication apparatus according to (10), in which the communication unit receives, from the radio base station, a request signal that is a signal requesting execution of the encryption key generation process with the wireless terminal, the request signal including address information of the radio base station and a random number generated by the radio base station, and transmits, to the radio base station, a response signal including the encryption key generated by the encryption key generation process using the address information and the random number.

(12)

The communication apparatus according to (11), in which the communication unit transmits the address information and the random number to the wireless terminal in the encryption key generation process.

(13)

The communication apparatus according to (11) or (12), in which the communication unit transmits, to the wireless terminal, the response signal including the encryption key encrypted by an encryption scheme applied to the radio base station.

(14)

The communication apparatus according to any one of (10) to (13), in which the communication unit transmits, to the radio base station, radio wave environment information of the wireless terminal and information regarding an encryption scheme that can be supported by the wireless terminal.

(15)

A communication method in which a communication apparatus that relays communication between a radio base station and a wireless terminal is configured to, in a case of being requested by the radio base station to perform an encryption key generation process of generating an encryption key used by the radio base station for communication with the wireless terminal, perform the encryption key generation process with the wireless terminal and transmit the encryption key generated by the encryption key generation process to the radio base station.

(16)

A communication apparatus including a communication unit that communicates with a radio base station via a relay device, in which the communication unit performs an encryption key generation process of generating an encryption key used for communication with the radio base station directly with the radio base station in a case where direct communication with the radio base station is possible, and performs the encryption key generation process with the relay device in a case where direct communication with the radio base station is not possible.

(17)

The communication apparatus according to (16), in which the communication unit performs the encryption key generation process directly with the radio base station in a case of directly receiving a connection request signal for relay communication or a message of the encryption key generation process from the radio base station, and performs the encryption key generation process with the relay device in a case of receiving the message of the encryption key generation process from the relay device.

(18)

The communication apparatus according to (17), in which in a case where the message of the encryption key generation process includes address information of the radio base station, the communication unit generates the encryption key using the address information.

(19)

The communication apparatus according to any one of (16) to (18), in which the communication unit directly transmits the connection request signal for relay communication to the radio base station in a case where direct communication with the radio base station is possible, and transmits the connection request signal to the relay device in a case where direct communication with the radio base station is not possible.

(20)

A communication method in which a communication apparatus that communicates with a radio base station via a relay device is configured to perform an encryption key generation process of generating an encryption key used for communication with the radio base station directly with the radio base station in a case where direct communication with the radio base station is possible, and perform the encryption key generation process with the relay device in a case where direct communication with the radio base station is not possible.

Note that the effects described herein are merely examples and are not limited, and other effects may be provided.

REFERENCE SIGNS LIST

1 Communication system
11 Source node
12 Relay node
13 Station
101 Control unit
102 Wireless communication unit
121 Communication control unit
122-1, 122-2 Data processing unit
123-1, 123-2 Signal processing unit
131-1 First communication unit
131-2 Second communication unit
201 Control unit
202 Wireless communication unit
221 Communication control unit
222 Data processing unit
231 Common data processing unit
232-1, 232-2 Individual data processing unit
233 Relay buffer
241-1 First communication unit
241-2 Second communication unit
251 Sequence management unit
252 Encryption/Decryption unit
261-1, 261-2 Retransmission processing unit
262-1, 262-2 Packet generation unit
263-1, 263-2 Connection processing unit
301 Control unit
302 Wireless communication unit
321 Communication control unit
331 Communication unit

The invention claimed is:

1. A communication apparatus configured to communicate with a wireless terminal via a relay device, the communication apparatus comprising:

at least one hardware processor; and at least one non-transitory memory containing instructions for causing the at least one hardware processor to perform operations comprising:

controlling execution of an encryption key generation process of generating an encryption key used for communication with the wireless terminal on a basis of at least one of whether or not direct communication with the wireless terminal is possible or an encryption scheme that can be supported by the relay device, wherein the operations further comprise:

requesting the relay device to perform the encryption key generation process in a case where the encryption scheme is an encryption scheme that can be used by the relay device with the wireless terminal, and performing the encryption key generation process with the wireless terminal via the relay device in a case where the encryption scheme is not an encryption scheme that can be used by the relay device with the wireless terminal.

2. The communication apparatus according to claim 1, wherein the operations further comprise performing the encryption key generation process directly with the wireless terminal in a case where direct communication with the wireless terminal is possible.

3. The communication apparatus according to claim 2, wherein, in a case of requesting the relay device to perform the encryption key generation process, the operations further comprise:

generating a random number, transmitting a request signal to the relay device, the request signal being a signal that requests the relay device to perform the encryption key generation process with the wireless terminal and including address information of the communication apparatus and the random number, and receiving a response signal including the encryption key generated by the encryption key generation process from the relay device using the address information and the random number.

4. The communication apparatus according to claim 2, wherein the operations further comprise directly transmitting a connection request signal for relay communication to the wireless terminal before directly performing the encryption key generation process with the wireless terminal.

5. The communication apparatus according to claim 1, wherein the operations further comprise determining whether or not direct communication with the wireless terminal is possible on a basis of at least one of radio wave environment information of the wireless terminal or a transmission source of a signal received.

6. The communication apparatus according to claim 5, wherein the operations further comprise acquiring, from the relay device, the radio wave environment information of the wireless terminal and information regarding the encryption scheme that can be supported by the wireless terminal before determining a method of the encryption key generation process.

7. A communication method in which a communication apparatus that communicates with a wireless terminal via a relay device is configured to perform a process comprising:

controlling execution of an encryption key generation process of generating an encryption key used for communication with the wireless terminal on a basis of at least one of whether or not direct communication with the wireless terminal is possible or an encryption scheme that can be supported by the relay device, wherein the encryption key generation process comprises:

requesting the relay device to perform the encryption key generation process in a case where the encryption scheme applied is an encryption scheme that can be used by the relay device with the wireless terminal, and performing the encryption key generation process with the wireless terminal via the relay device in a case where the encryption scheme is not an encryption scheme that can be used by the relay device with the wireless terminal.

8. A communication apparatus configured to relay communication between a radio base station and a wireless terminal, the communication apparatus comprising:

at least one hardware processor; and at least one non-transitory memory containing instructions for causing the at least one hardware processor to perform operations comprising:

in a case of being requested by the radio base station to perform an encryption key generation process of generating an encryption key used by the radio base station for communication with the wireless terminal, the performing the encryption key generation process with the wireless terminal and transmitting the encryption key generated by the encryption key generation process to the radio base station, wherein the operations further comprise:

receiving, from the radio base station, a request signal that is a signal requesting execution of the encryption key generation process with the wireless terminal, the request signal including address information of the radio base station and a random number generated by the radio base station, and transmitting, to the radio base station, a response signal including the encryption key generated by the encryption key generation process using the address information and the random number, and wherein the operations further comprise at least one of:

transmitting the address information and the random number to the wireless terminal in the encryption key generation process, or transmitting, to the wireless terminal, the response signal including the encryption key encrypted by an encryption scheme applied to the radio base station.

9. The communication apparatus according to claim 8, wherein the operations further comprise transmitting, to the radio base station, radio wave environment information of the wireless terminal and information regarding an encryption scheme that can be supported by the wireless terminal.

10. A communication method in which a communication apparatus that relays communication between a radio base station and a wireless terminal is configured, to perform a process comprising:

in a case of being requested by the radio base station to perform an encryption key generation process of generating an encryption key used by the radio base station for communication with the wireless terminal;

performing the encryption key generation process with the wireless terminal and transmitting the encryption key generated by the encryption key generation process to the radio base station, wherein the encryption key generation process comprises:

receiving, from the radio base station, a request signal that is a signal requesting execution of the encryption key generation process with the wireless terminal, the request signal including address information of the radio base station and a random number generated by the radio base station, and transmitting, to the radio base station, a response signal including the encryption key generated by the encryption key generation process using the address information and the random number; and wherein the encryption key generation process further comprises at least one of:

transmitting the address information and the random number to the wireless terminal in the encryption key generation process, or transmitting, to the wireless terminal, the response signal including the encryption key encrypted by an encryption scheme applied to the radio base station.

11. A communication apparatus configured to communicate with a radio base station via a relay device, the communication apparatus comprising:

at least one hardware processor; and at least one non-transitory memory containing instructions for causing the at least one hardware processor to perform operations comprising:

performing an encryption key generation process of generating an encryption key used for communication with the radio base station directly with the radio base station in a case where direct communication with the radio base station is possible, and performing the encryption key generation process with the relay device in a case where direct communication with the radio base station is not possible, wherein the operations further comprise:

requesting the relay device to perform the encryption key generation process in a case where the encryption scheme is an encryption scheme that can be used by the relay device with the base station, and performing the encryption key generation process with the base station via the relay device in a case where the encryption scheme is not an encryption scheme that can be used by the relay device with the wireless terminal.

12. The communication apparatus according to claim 11, wherein the operations further comprise:

performing the encryption key generation process directly with the radio base station in a case of directly receiving a connection request signal for relay communication or a message of the encryption key generation process from the radio base station, and performing the encryption key generation process with the relay device in a case of receiving the message of the encryption key generation process from the relay device.

13. The communication apparatus according to claim 12, wherein, in a case where the message of the encryption key generation process includes address information of the radio base station, the operations further comprise generating the encryption key using the address information.

14. The communication apparatus according to claim 11, wherein the operations further comprise:

directly transmitting the connection request signal for relay communication to the radio base station in a case where direct communication with the radio base station is possible, and transmitting the connection request signal to the relay device in a case where direct communication with the radio base station is not possible.

15. A communication method in which a communication apparatus that communicates with a radio base station via a relay device is configured to perform a process comprising:

performing an encryption key generation process of generating an encryption key used for communication with the radio base station directly with the radio base station in a case where direct communication with the radio base station is possible, and performing the encryption key generation process with the relay device in a case where direct communication with the radio base station is not possible, wherein the encryption key generation process comprises:

requesting the relay device to perform the encryption key generation process in a case where the encryption scheme is an encryption scheme that can be used by the relay device with the base station, and performing the encryption key generation process with the base station via the relay device in a case where the encryption scheme is not an encryption scheme that can be used by the relay device with the wireless terminal.

* * * * *